United States Patent [19]

Todd

[11] 4,259,661
[45] Mar. 31, 1981

[54] APPARATUS AND METHOD FOR RECOGNIZING A PATTERN

[75] Inventor: Robert Todd, Warren, Mich.

[73] Assignee: Burroughs Corporation, Detroit, Mich.

[21] Appl. No.: 938,850

[22] Filed: Sep. 1, 1978

[51] Int. Cl.³ .............................................. G06K 9/70
[52] U.S. Cl. ................ 340/146.3 AQ; 340/146.3 AE; 340/146.3 MA
[58] Field of Search ................. 340/146.3 R, 146.3 Y, 340/146.3 S, 146.3 T, 146.3 AQ, 146.3 AC, 146.3 MA, 146.3 AE

[56] References Cited

U.S. PATENT DOCUMENTS

| | | | |
|---|---|---|---|
| 3,165,718 | 1/1965 | Fleisher | 340/146.3 Y |
| 3,297,993 | 1/1967 | Clapper | 340/146.3 AE |
| 3,341,814 | 9/1967 | Chow | 340/146.3 S |
| 3,492,647 | 1/1970 | Otten et al. | 340/146.3 R |
| 3,609,686 | 9/1971 | Savory et al. | 340/146.3 T |
| 3,629,849 | 12/1971 | Sauvan | 340/146.3 MA |
| 3,902,160 | 8/1975 | Kawa | 340/146.3 AQ |
| 3,902,160 | 8/1975 | Kawa | 340/146.3 AQ |
| 4,061,998 | 12/1977 | Ito | 340/146.3 AC |

FOREIGN PATENT DOCUMENTS

1208126 10/1970 United Kingdom .
1243969 8/1971 United Kingdom .
1293831 10/1972 United Kingdom .
1295227 11/1972 United Kingdom .
1423010 1/1976 United Kingdom .

OTHER PUBLICATIONS

NBS Tech. Note 112, "Automatic Character Recognition", U.S. Dept. of Commerce PB161613, Apr. 24, 1963, pp. 98-101.
Sammon, "Interactive Pattern Analysis and Class", *IEEE Trans. on Computers*, vol. C-19, No. 7. Jul. 1970; pp. 594-616.
Cork et al., "Programming Approach to Pattern Recognition" *IBM Tech. Disclosure Bulletin*, vol. 18, No. 4. Sep. 1975. pp. 1182-1184.

*Primary Examiner*—Leo H. Boudreau
*Attorney, Agent, or Firm*—Carl Fissell, Jr.; Kenneth J. Cooper; Charles E. Quarton

[57] ABSTRACT

Apparatus and method are provided for recognizing a presented pattern such as a machine printed character. The apparatus includes a driving assembly for moving a character bearing medium into a scanning area. A pair of lamp sources illuminate the character in the scanning area. A monolithic photosensitive array responsive to the brightness of the reflective light from the illuminated character over a given time period is positioned opposite the scanning area. The photosensitive array or first storage circuit develops and stores an analog video signal which is subsequently converted into a digital representation of the analog signal by a signal processing circuit. A second storage circuit stores a multi-bit binary code representing the brightness of the present character. A segmentation circuit divides the binary representation of the character into 25 subregions and a summation circuit adds the numerical value of the multi-bit codes in each subregion together to obtain the corresponding summation for each subregion. A normalization circuit normalizes each of the subregions to form corresponding subregion densities which define components of a feature vector of a 25 dimensional orthogonal coordinate system. A vector normalizing circuit normalizes the length of the feature vector. A projecting circuit projects the normalized feature vector onto a set of predetermined subspaces comprising sets of eigenvectors each of the classes of characters to be recognized being represented by a set of eigenvectors. A selector circuit selects one of the characters as the present character according to a predetermined algorithm employing the results of the projections.

27 Claims, 18 Drawing Figures

FIG. 7.

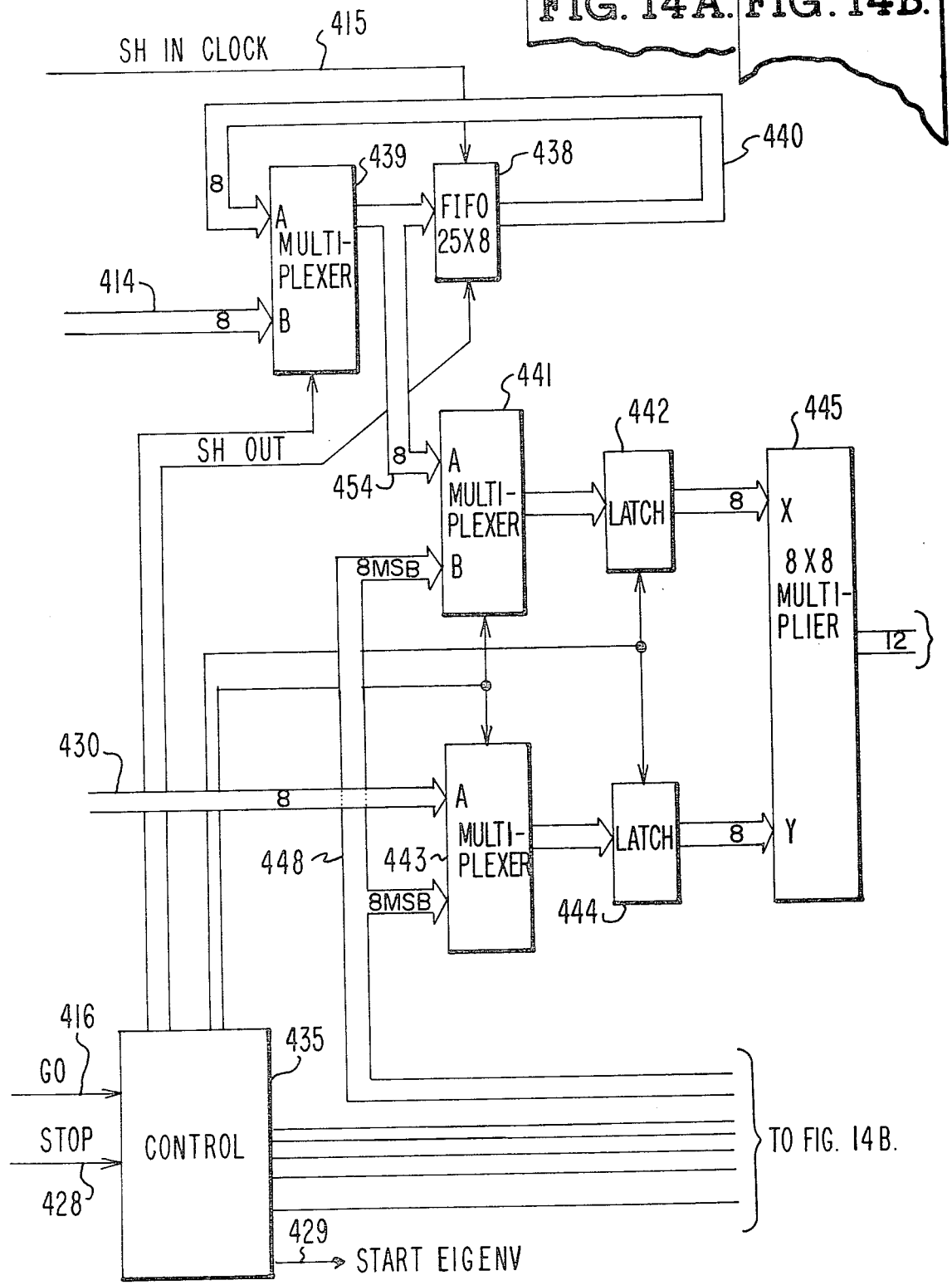

APPARATUS AND METHOD FOR RECOGNIZING A PATTERN

BACKGROUND OF THE INVENTION

1. Field of the Invention

The invention relates in general to method and apparatus for recognizing patterns and in particular to method and apparatus for recognizing multifont machine printed characters.

There are many character recognition schemes relative to multifont machine printed characters. Such techiques can be used for automatically reading characters from documents such as the check number or check courtesy amounts, or any document containing strings of characters. The manual encoding of the check amount in magnetic ink for automatic document processing (MICR) represents a significant cost to the banking industry. A courtesy amount reader should be able to reduce this cost either through automatic MICR encoding or direct input to data processing systems. Basically, a courtesy amount reader must be capable of optically scanning a specified area of a document extracting the courtesy amount and recognizing each character of the courtesy amount. If the courtesy amount reader is to be able to handle successfully a significant percentage of documents, the character recognition algorithm must have multifont capabilities. The set of characters which must be recognized includes those normally encountered in courtesy amounts. This set includes the numerals 0 through 9 and five special characters, the dollar sign, the dash, the comma, the period and the asterisk.

The manual processing of any type of large volume bills, such as electrical or telephone company bills, constitutes an expensive and slow process. In this application, where the company has control of the printing process, the number of fonts is limited and the location of the characters within a relatively narrow band (or window so called) across the document can be controlled. The set of characters will generally be the digits 0 through 9, as well as special symbols used as field markers. Thus, an optical character recognition system that reads and recognizes a single row of characters located in a narrow band across a document is also highly desireable.

2. Prior Art

One of the first classification techniques tried is attributed to C. K. Chow whose technique is shown in U.S. Pat. No. 3,341,841 and also appears in IRE Transactions on Electronic Computers, Volume EC-6, page 247, December 1957. Chow's technique involves selecting prototype characters from a number of different classes of characters and thereafter forming feature vectors for the prototypes. An average vector of the prototypes from each of the classes is then formed. The dot product between an unknown character and each average vector is then formed in order to determine the cosine of the angle between the unknown vector and each average vector. If a particular dot product is large, the angle is small and the unknown is similar to the particular class of characters represented by that average vector. The dot product can also be viewed as a projection of the unknown vector onto each average vector. The unknown vector can thereafter be classified by selecting the largest projection.

Two comments can be made regarding this technique. First, by definition the technique searches for average features. In the multifont case, the average features may not be sufficient for classification purposes. Consequently, this technique would be better suited to a single font. The second comment concerns the type of decision process available using this technique. Classification only on the basis of the maximum projection involves a large risk. Requiring the maximum projection to be greater than all others by some amount reduces the risk but may reduce a larger number of rejects depending upon the exact problem.

Another method for recognizing characters is called the subspace method. The subspace method is based on the assumption that there exist class dependent coordinate systems such that the important (or weights) of the coordinate axis are not uniform. See George Nagey proceedings of the IEEE 56,836, (1968) and Watanabe et al "Evaluation of the Selection of Variables in Pattern Recognition" in *Computer and Information Sciences,* II edited by J. T. Tou. The Nagey reference deals with a covariance matrix which has a shortcoming in that the average features of a character are lost by subtracting the average vector from the feature vector. The Watanabe et al reference discloses a projection method for expanding a feature vector having unit length on a subspace.

An apparatus constructed in accordance with the instant invention for recognizing a presented pattern as being one of a plurality of predetermined classes of patterns comprises generating means, projecting means and selector means. The generating means generates predetermined combination of signals representing the geometric configuration of the presented pattern. The predetermined combination of signals defines a feature vector of the presented pattern. The projecting means projects the feature vector onto a set of predetermined multi-dimensional subspaces which characterize the predetermined classes. The selector means selects one of the patterns as a presented pattern according to a predetermined algorithm employing the results of the projections prior to the time that the entire projecting process is completed.

A method as defined by the instant invention for recognizing a presented pattern as being in one of a plurality of predetermined classes of patterns comprises the following steps. One, generating a predetermined combination of signals representing the geometric configuration of the presented pattern. The presented combination of signals defines a feature vector of the presented pattern. Two, the feature vector is projected onto a set of predetermined multi-dimensional subspaces characterizing the predetermined classes. And three, one of the patterns is selected as the presented pattern according to a predetermined algorithm employing the results of the projections prior to the entire projection process being completed.

The present disclosed embodiment is designed to recognize a single horizontal row of characters on a document wherein the row is located within a one half inch band and wherein characters cannot be located vertically above each other or touch each other.

BRIEF DESCRIPTION OF THE DRAWING

Other advantages of the present invention will be readily appreciated as the same becomes better understood by reference to the following detailed description when considered in connection with the accompanying drawings wherein:

FIG. 7 shows samples of machine printed data base characters with four logic levels as positioned in an array;

FIG. 14 is a diagram of the relationship between FIG. 14A and FIG. 14B;

FIGS. 14A and 14B show in block diagram form class projection circuitry for the subject invention;

DESCRIPTION OF THE PREFERRED EMBODIMENT

Feature Vector Formation

Figure 7:
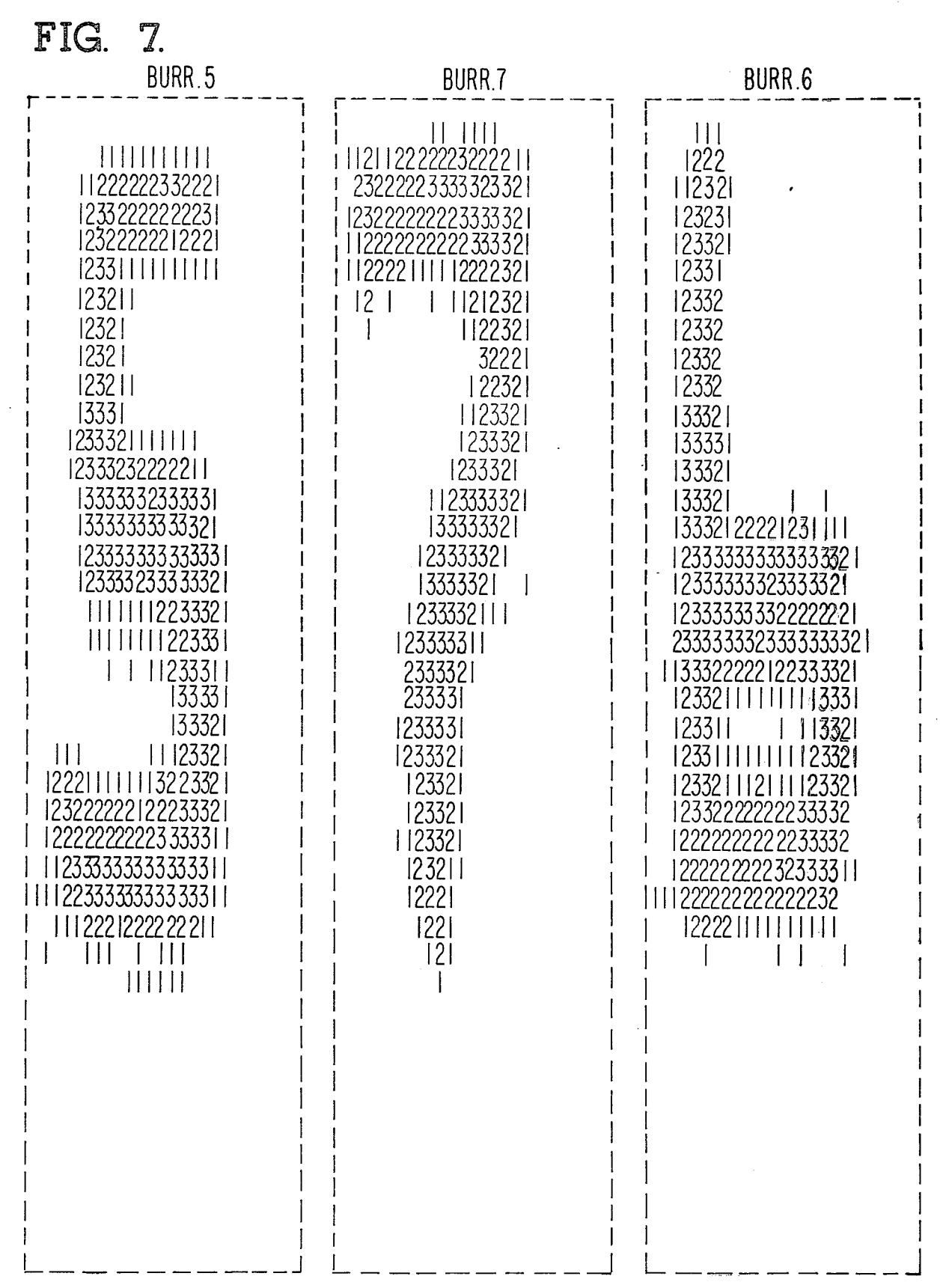

There are two main reasons for the concept of a feature vector. First, a feature vector results in a reduction in the amount of data which must be used by a particular algorithm. Considering the arrays representing the characters "5", "7" and "6" such as is shown in FIG. 7, there is present a large amount of data. The feature vector reduces the amount of data, while still providing an accurate representation of the character. Second, the purpose of the feature vector is to provide some normalization of characters of the same class. Suppose two characters of the same class, which differ by some degree are considered. The difference in the two characters may be because of different fonts, different densities of ink, or any other of several reasons. If the feature vector is properly selected, the vectors which represent the two characters should be similar, regardless of the difference which exist in the scanned representation of the characters. The feature vector must, therefore, be insensitive to the precise value of reflectance at any given bit position, while exhibiting enough resolution to enable correct classification. The feature vector should further be invariant to size variations, and to variations in stroke width. The problem of rotations of the characters is not considered important in machine-printed recognition.

Figure 8:
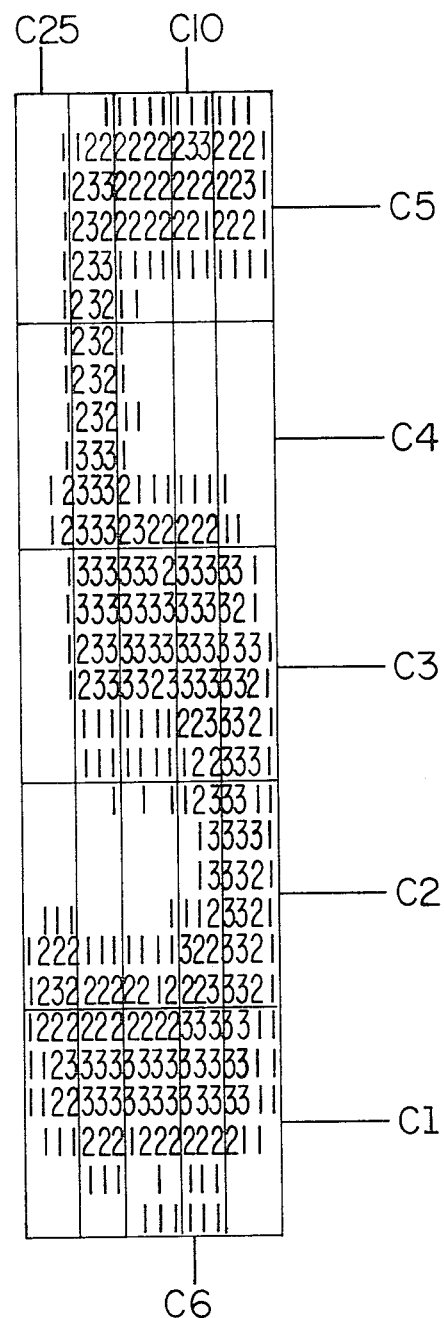
FIG. 8 shows an example of the derivation of a 25 dimensional feature vector for a particular character "5"

Consider, initially, the binary representation of a character in some array. A general knowledge of the distribution of dark and light regions within the boundaries of a character should contain sufficient information to correctly classify that character. Suppose a character is divided into a set of subregions in the following way. After determining the height of the character, divide the character into N horizontal regions of approximately equal height as shown in FIG. 8 wherein N=5. If the height is an even multiple of five, each horizontal region will consist of the same number of rows. Otherwise, additional rows must be included in some of the regions. The placement of the additional rows is done according to some fixed set of rules. The character is now divided into N' (wherein N'=5) vertical regions in an analogous fashion. The character is now divided into N×N' subregions. The density of ink in each region is determined by adding of digits in a region and dividing by the product of the number of bit positions within the region and the number of ink intensities available in the sensed character. In FIG. 8, the density of the region in the upper left-hand corner is 5 divided by the product of 24 and 3 for a quotient of 5/72. A feature vector is formed by numbering the regions in some manner, and using as the components of the vector the density in the corresponding regions. The vector is represented by C, with components $C_i$. Then, in FIG. 8, $C_{25}=5/72$, $C_5=19/24\times 3=29/72$, and so on. This construction yields a vector C which has some direction in a multi-dimensional space, and a length given by $$L = \left( \sum_{i=1}^{N \times N'} C_i^2 \right)^{\frac{1}{2}} \tag{1}$$

It is apparent that the state of a single bit position will not affect the feature vector to any great extent. The problem of size normalization of the characters has been automatically taken care of through the definition of the feature vector. The feature vector is, however, still sensitive to the stroke width. This problem can be partially removed by normalizing the length of each vector to one unit, through the replacement $$C_i \rightarrow C_i / \left( \sum_{j=1}^{N \times N'} C_j^2 \right)^{\frac{1}{2}} \tag{2}$$

This renders the feature vector somewhat insensitive to line-width variations.

Several points regarding the feature vector deserve mention. First, there are many possible ways to divide a character into sub-regions. A detailed study reveals that a division into 25 (5×5) regions yields the optimum recognition rate. Second, if the character is represented by an array with more than two levels as shown in FIG. 7, the definition of the feature vector must be modified slightly. The most obvious way to modify the vector is to simply use the value of the reflectance at each point when adding up the values in each subregion. However, there are other methods which might be used. The third point relates to modifications which are necessary if the characters are rotated or skewed by a large amount. This problem, however, is generally only encountered in the recognition of handprinted characters.

II. Class-Dependent Subspaces

The feature vector described in the previous section is a representation of a character in a 25-dimensional vector space. The mathematical notation which allows one to describe a set of numbers as a vector implicitly assumes a reference to some set of basis vectors. These basis vectors are usually orthogonal and normalized to unit length, although this is an arbitrary convenience. In representing a character with a 25-dimensional feature vector, a 25-dimensional orthogonal coordinate system is referred to.

The resulting coordinate system, which is independent of the class of characters being considered, refers to certain specified subregions of a character array. There is no reason to assume that this coordinate system is, in any sense, the optimum system. That is, there may exist coordinate systems which can better represent a character, and the coordinate systems may be dependent upon the class of character considered.

Suppose the feature vector representing some character from the class k, refers to some L-dimensional coordinate system. Furthermore, suppose it is possible to find an orthogonal transformation (i.e., a rotation) of the original coordinate system such that the weights (in reference to class k) are concentrated on $L'(L'<L)$ coordinate axes in the rotated system. It should be possible to represent the characters of class k in a subspace of the rotated L-dimensional space. That is, the $L'$ components of the feature vector, corresponding to the coordinate axes with the largest weights, should be sufficient to represent the characters of class k. Further, if one tried to represent a character from a different class in the $L'$-dimensional subspace developed for the class k, the representation would not be sufficient to properly specify the character. Assuming there exists as set of characters from a class k, let $c_k^{\rightarrow(m)}$ represent the feature vector in L-dimensions of the m-th proptotype of class k, where m=1,2, ... M(k). It is assumed that the feature vectors are normalized: $c_k^{\rightarrow(m)} \cdot c_k^{\rightarrow(m)} = 1$. Let $\{e^{\rightarrow(i)}\}$, i=1,2, ... L, represent the starting orthogonal coordinate system axes, with $e^{\rightarrow(i)} \cdot e^{\rightarrow(j)} = \delta_{ij}$. The i-th component of $c_k^{\rightarrow(m)}$ is then $$c_k^{(m)}(i) = c_k^{\rightarrow(m)} \cdot e^{\rightarrow(i)}. \tag{3}$$

Suppose there exists another orthogonal coordinate system, $\{f^{\rightarrow(i)}\}$, which is related to $\{e^{\rightarrow(i)}\}$ by the rotation R, where $$R_{ij} = e^{\rightarrow(i)} \cdot f^{\rightarrow(j)}. \tag{4}$$

The components of $c_k^{\rightarrow(m)}$ in the rotated system $\{f^{(j)}\}$ are $$c_k'^{(m)}(j) = c_k^{\rightarrow(m)} \cdot f^{\rightarrow(j)}, \tag{5}$$

where the prime indicates that the components are expressed relative to a new coordinate system.

The optimal coordinate system for a class k is assumed to be the system such that if a character from k is expanded in $L'$ dimensions ($L'<L$), the mean square error which results is a minimum. Hence, the "best features (directions) are those which most nearly approximate the original prototypes with the fewest dimensions. It can be shown that the coordinate axes of the optimal system for the class k, $\{f_k^{\rightarrow(j)}\}$, are determined from the solution of the eigenvalue problem:

$$A^k f_k^{\rightarrow(j)} = \lambda j\, f_k^{\rightarrow(j)}, \tag{6}$$

where $A^k$ is the autocorrelation matrix, with $$A^k{}_{ij} = \Sigma c_k^{(m)}(i)\, c_k^{(m)}(j)/M(k). \tag{7}$$

$\lambda j$ is the eigenvalue associated with the j-th eigenvector $f_k^{\rightarrow(j)}$. The effectiveness of each feature $f_k^{\rightarrow(j)}$ in terms of representing a character from class k is determined by the size of its corresponding eigenvalue, $\lambda j$. If a character is to be represented by $L'$ dimensions in the rotated system, then the $L'$ eigenvectors corresponding to the largest $L'$ eigenvalues should be selected as features.

The practical determination of the eigenvectors for a class k involves the diagonalization of the autocorrelation matrix (defined by Eq. 7). This requires that we obtain a rotation matrix, $R^k$, such that $$A'^k = R^k A^k R^{kT}, \tag{8}$$

where the autocorrelation matrix relative to the rotated coordinate system, $A'^k$ is diagonal. The eigenvalues are then the diagonal elements of $A'^k$, and the eigenvectors are the rows of the rotation matrix. The components of the feature vector $c_k^{\rightarrow(m)}$, relative to the rotated system, are given by Eq. 5.

$$c'_k{}^{(m)}(j) = c_k^{\rightarrow(m)} \cdot f_k^{\rightarrow(j)}, \tag{9}$$

where $f_k^{(j)}$ is the j-th eigenvector of the class k.

III. Decision Algorithm

Assume some data base of characters belonging to K classes. Each class is defined by a set of prototypes $c_k^{\rightarrow(m)}$, where m=1,2, ... M(k), with M(k) the number of prototypes selected to represent the class k. Using these prototypes, an algorithm can be developed which will correctly recognize the characters of the data base.

Initially, the autocorrelation matrix for each class (Eq. 7), must be found and each of the matrices must be diagonlaized. The result is a set of ordered eigenvectors for each class $\{f_k^{\rightarrow(j)}\}$. These eigenvectors form a set of orthogonal coordinate axes. The autocorrelation-subspace technique states that these coordinate systems are optimum in the sense that if a character belongs to a particular class $k_o$, the coordinate axes $\{f_{k_o}^{\rightarrow(j)}\}$ can be used to represent the character in a subspace of reduced dimensionality. The utilization of the autocorrelation-subspace technique requires that an unknown character, represented by a 25-dimensional feature vector $c^\rightarrow$, be expanded in terms of the eigenvectors of the different classes. The projection of $c^\rightarrow$ onto the j-th eigenvector of the class k is simply given by $$c_k^{(j)} = c^\rightarrow \cdot f_k^{\rightarrow(j)}. \tag{10}$$

$c_k^{(j)}$ is then the j-th component of the unknown character as represented by the optimal coordinate system of class k. We have therefore K different representations of the unknown, corresponding to the k classes. The square of the projection of the unknown, onto an n-dimensional subspace of the class k is given by $$P(n,k) = \sum_{j=1}^{n} (\vec{c} \cdot \vec{f_k^{(j)}})^2. \tag{11}$$

If the unknown →c is a member of the class $k_0$, then $p(n,k_0)$ should be larger than any other $p(n,k)$.

As described hereafter a particular character is projected onto the subspaces of 15 classes of characters and the corresponding projections $p(n,k)$ are developed. As described, the dimensionality of the subspaces was limited to 16. Since the length of all projected vectors is one unit, no projections can ever be larger than one.

Given the values of $p(n,k)$ for a particular character some decision must be made as to the classification of the character. The following section describes a decision algorithm which could be employed in the recognition of machine-printed characters.

A. Five Level Discrete

The values of $p(n,k)$ must be employed in the decision to classify a character. If a character is to be classified using an n-dimensional subspace, and the character belongs to the class $k_o$, then $p(n,k_o)$ must be greater than $p(n,k)$ for all other k. Further, in order to avoid misreads, $p(n,k_o)$ should be greater than all other $p(n,k)$ by some finite amount. The amount that $p(n,k_o)$ exceeds all other $p(n,k)$ may be dependent upon n. Since all $p(n,k)$ converge to one as n→25, a smaller separation as the value of n increases may be required.

The above reasoning led to the following decision algorithm. Suppose $p(n,k_o)$ corresponds to the maximum projection for a given value of n, and $p(n,k)$ corresponds to the next largest projection. The decision to classify the character into the class $k_o$ is then based on the following five criteria:

(1) If a. $p(n,k_o) > 0.85$, and b. $p(n,k_o) > p(n,k) + 0.15$, all $k \neq k_o$, then the unknown is classified as belonging to the class $k_o$.

(2) If a. $p(n,k_o) > 0.90$ and b. $p(n,k_o) > p(n,k) + 0.10$, all $k \neq k_o$, then the unknown is classified as belonging to the class $k_o$.

(3) If a. $p(n,k_o) > 0.94$, and b. $p(n,k_o) > p(n,k) + 0.06$, all $k \neq k_o$. then the unknown is classified as belonging to the class $k_o$.

(4) If a. $p(n,k_o) > 0.98$, and b. $p(n,k_o) > p(n,k) + 0.035$, all $k \neq k_o$, then the unknown is classified as belonging to the class $k_o$.

(5) If a. $p(n,k_o) > 0.99$, and b. $p(n,k_o) > p(n,k) + 0.0205$, all $k \neq k_o$, then the unknown is classified as belonging to the class $k_o$.

Given the values of $p(n,k)$ for a given character, and beginning with $n=1$ the five decision criteria is checked. If no decision is reached, n is incremented and the criteria rechecked. If no decision can be reached after 16 eigenvectors are utilized, the character is rejected.

Although the levels in the decision algorithm may appear somewhat arbitrary, they were arrived at only after a considerable amount of testing. These particular levels yield a minimal misread rate over the IEEE data base.

B. Straight Line

Again, considering the projections defined by Eq. 11 suppose $p(n,k_1)$ corresponds to the maximum projection for a given value of n, and $p(n,k_2)$ corresponds to the next largest value of the projection. The five-level discrete decision algorithm allows us to classify an unknown as belonging to the class k, if certain conditions on $p(n,k_1)$ and $p(n,k_2)$ lies above the shaded region, the character is accepted, and is classified as belonging to the class $k_1$.

A straight line decision algorithm is suggested by the fact that the five points defined by the discrete decision logic are nearly co-linear. If a line is drawn from (0.85, 0.70) to (0.99, 0.9695), the three intermediate points all lie near to the line: This line, the equation of which is $$p(n,k_2) = 1.925 p(n,k_1) - 0.9362, \qquad (12)$$

forms a starting point for the straight line decision algorithm. Assume some line with a slope m and intercept b has been determined. The straight line decision algorithm is then defined by the following conditions:

(a) If $p(n k_1) > 0.83$, for some n, and (b) If $p(n,k_2) < m \cdot p(n,k_1) + b$, then classify the unknown as belonging to the class $k_1$.

Figure 16:
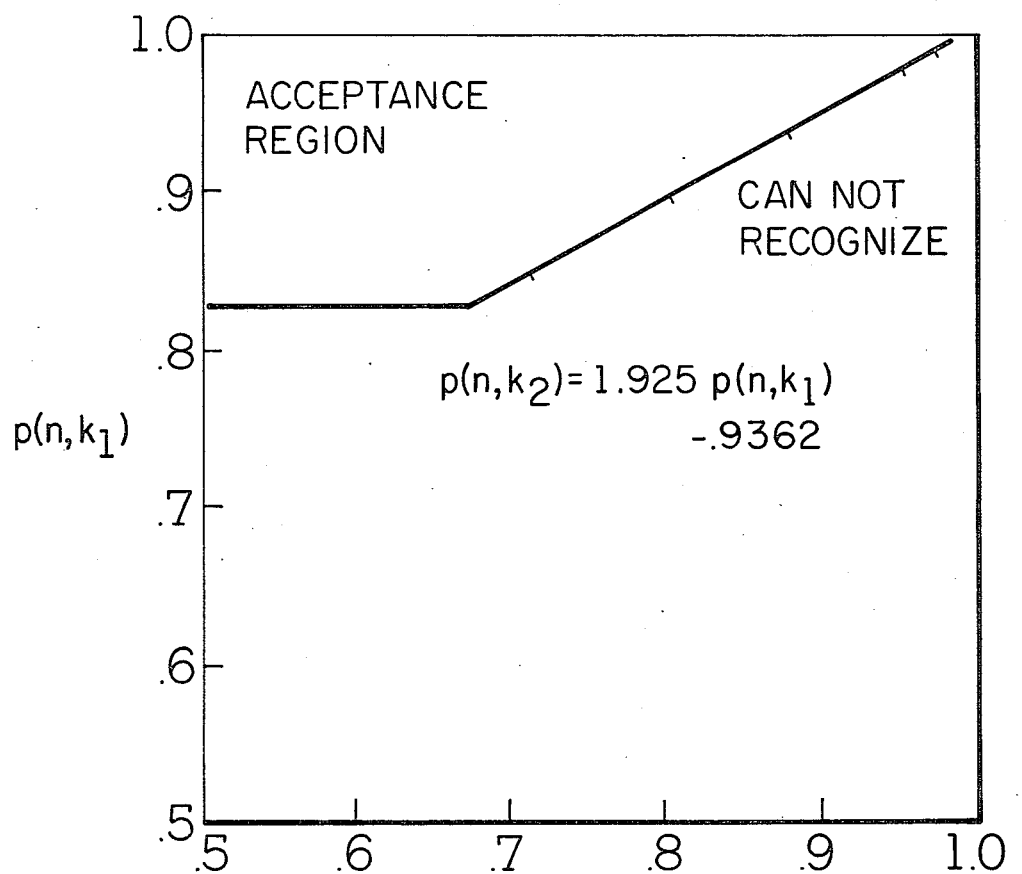
FIG. 16 is a graph comparing the accept-reject criteria for the straight line decision algorithm of the class selection circuitry of the invention.

The advantage of the straight line decision algorithm can be seen in FIG. 16. The shaded areas, which were part of the reject region for the discrete decision algorithm, will now be included in the acceptance region (for $m = 1.925$, $b = -0.9362$). If values of m and b can be found which yield small misread rates the reject rate of the straight line algorithm should be less than the reject rate of the discrete algorithm. The straight line algorithm is the preferred algorithm.

The present embodiment is designed to serially detect a single row of characters as the document they are on passes before the character recognition apparatus of the present invention. The apparatus optically scans a one half inch horizontal band across the document as the document passes thereby. The characters to be detected must be located within the one half inch band and such characters within the band cannot be located vertically above one another, and cannot physically touch each other.

The apparatus of the present invention is designed to detect 20 classes of characters (an arbitrarily chosen number). For example, the numbers 0 through 9 each comprise a class and ten other unique graphic symbols can comprise the other ten classes. The only requirement is that the graphic symbol of each class be distinct from the other 19 classes. The present apparatus is also designed to detect multiple inter mixed fonts. For example, it can detect inter mixed fonts such as OCRA, OCRB, as well as subsets OCR1428, OCR1403; and OCR1407.

The character recognition technique involves a macro rather than a micro view of the character; that is, the apparatus analyzes the character by large regions rather than individual bit position intensities. It divides the character into 25 approximately equal sized subregions (5 by 5 matrix) and the average ink density from the 25 subregions is treated as a feature vector in 25 dimensional orthogonal space. The feature vector for the character to be identified is projected onto eigenvectors representing each class of characters, one dimension at a time. After the completion of each dimension all projections, a decision algorithm determines whether the character can be recognized. Up to 5 dimensional projections (5 eigenvectors) are used in this embodiment.

Figure 1:
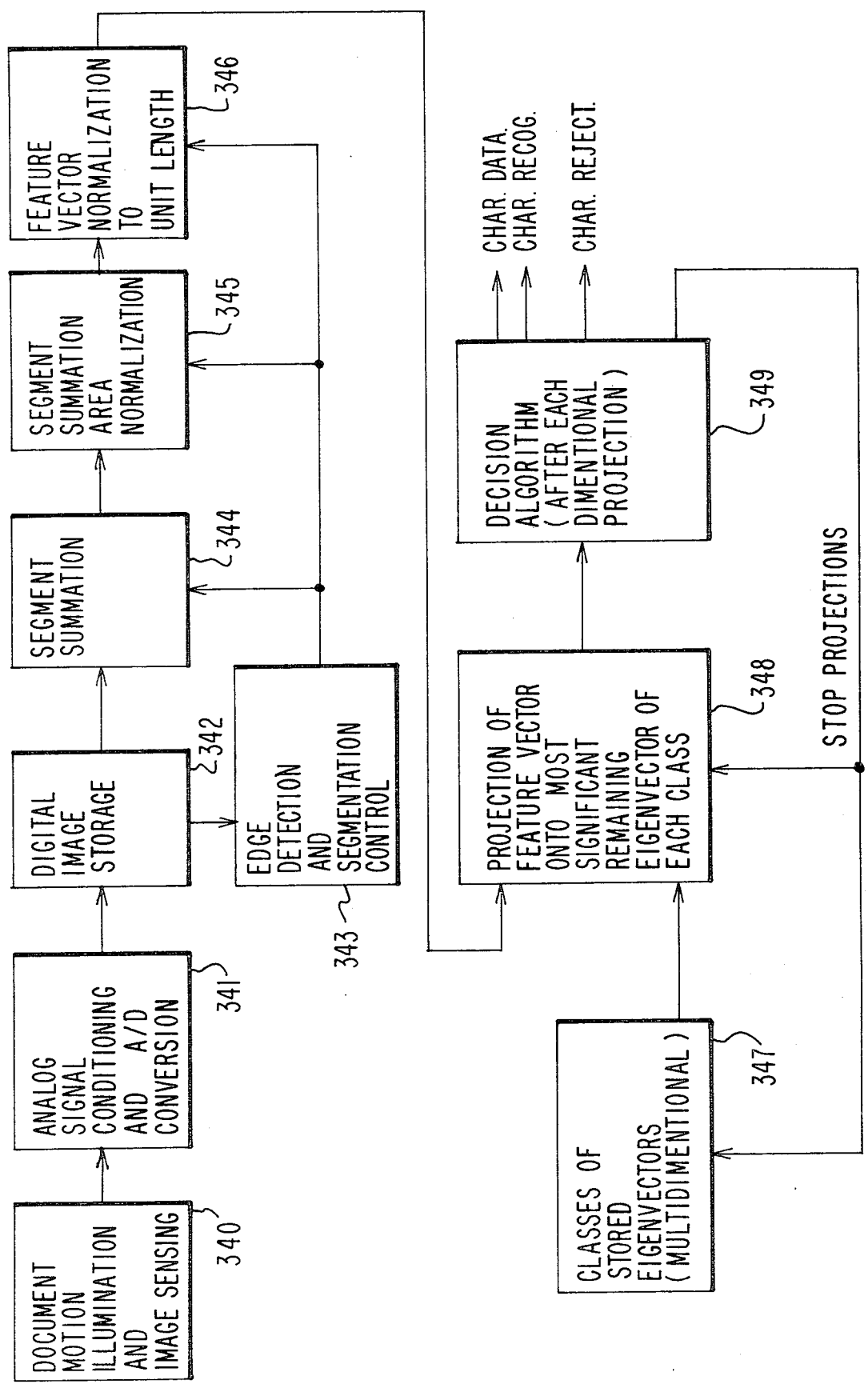
FIG. 1 is a block diagram of the subject invention, which embodiment recognizes a single line of characters.

FIG. 1 shows in block diagram form the apparatus of the embodiment. Block 340 represents the mechanics for driving the document past an optical scanner and includes a light source for illuminating the document, and the optical scanner itself. The optical scanner includes a lens for focusing light reflected from the document, an aperture and a photosensitive array. The photosensitive array provides a serial sequence of analog video signals to block 341.

Block 341 receives the serial analog video signals from block 340, converts these two digital video signals (two bits parallel) and provides these at its output at the same rate it receives the analog signals at its input. These digital video signals are input to digital image storage block 342.

Block 342 is a matrix of daisy chained shift registers through which the two bit parallel video signals are shifted. Block 342 provides enough storage so that it can contain a complete character to be recognized at once as the character rolls through its shift registers. (FIG. 7 shows in pictorial stop action the appearance of a character as it passes through block 342.) Attached to block 342 is edge detection and segmentation control 343.

Block 343 monitors the contents of block 342, and locates and keeps track of the bottom, top, right and left edges of each character as it rolls through block 342. Once all the edges of the character are located, its height and width are known and block 343 segments the character up into 25 subregions in a 5 by 5 manner. Each subregion is approximately the same heighth and width. (FIG. 8 shows pictorially what a segmented character might look like.)

As the two bit video signals sequentially roll out of storage block 342, segment summation block 344 sums these up based upon width of the 25 subregions they belong to. Block 344 provides at its output 25 numbers (each 8 bits long). Each number represents the total ink intensity in a corresponding one of the 25 subregions. These 25 numbers are then input to segment summation area normalization block 345.

Block 345 divides each number by the area of its corresponding subregions because due to physical constraints, not all subregions are exactly the same size. Thus, block 345 outputs 25 numbers (each 8 bits long) and each number represents the average ink intensity in a corresponding one of the 25 subregions. These 25 numbers output from block 345 are treated as a feature vector in 25 dimensional orthogonal space for character recognition purposes. The output of block 345 is input to feature vector normilization block 346.

Block 346 takes the feature vector, which is in 25 dimensional orthogonal space, and normalizes it such that it is a unit length in 25 dimensional orthogonal space. Normalizing to unit length is highly desireable because it fixes the binary point with respect to each component of the vector and this in turn simplifies the hardware necessary when the feature vector is later projected onto the eigenvectors.

Block 347 stores the eigenvectors upon which the feature vectors will be projected. Stored in block 347 are 20 classes of eigenvectors, (corresponding to the 20 classes of characters to be recognized) with the 5 most significant eigenvectors for each class contained therein. Each eigenvector has 25 (8 bit) components and has a unit length to simplify the projection hardware.

Projection block 348 projects the (25 component) feature vector from block 346 onto the (25 component) eigenvectors from block 347 one dimension at a time.

That is, the feature vector is first projected onto the most significant eigenvector of each of the 20 classes of prototype characters to be recognized. After the first projection is complete, the decision algorithm block 349 decides whether the character has been recognized. If it has been recognized, the projection process is stopped. If it has not been recognized, then the feature vector from block 346 is projected onto the most significant eigenvector of each class as it is received from block 347. Such second projection process involves combining the first and second projections of each class to yield enough projections for two dimensions. The decision algorithm of block 349 is then applied to the 20 net projections to determine if the character has been recognized. If the character has not been recognized, then the projection and decision process is continued for up to the five most significant eigenvectors (corresponding to projection onto five dimensional subspaces). After five diemensional projections and decisions (an arbitrarily chosen number) the character is rejected if it has not been recognized. It should be noted that the projection of the feature vector onto two or more eigenvectors is referred to hereinafter as projecting the feature vector onto predetermined multi-dimensional subspaces.

Briefly, referring to the embodiment of FIG. 1; blocks 340 through 346 provides generating means for generating a feature vector; block 347 provides a storage means for storing an array of signals representing each class or character; block 348 provides projecting means for projecting feature vectors onto a set of predetermined multi-dimensional subspaces characterizing the predetermined classes one dimension at a time; and block 349 provides selector means for selecting one of the characters as the presented character according to a predetermined algorithm and applying the results of the projections after each projection onto a dimension of the subspace.

FIGS. 2 through 6 should detail implementation for blocks 340 and 341 of FIG. 1.

Figure 2:
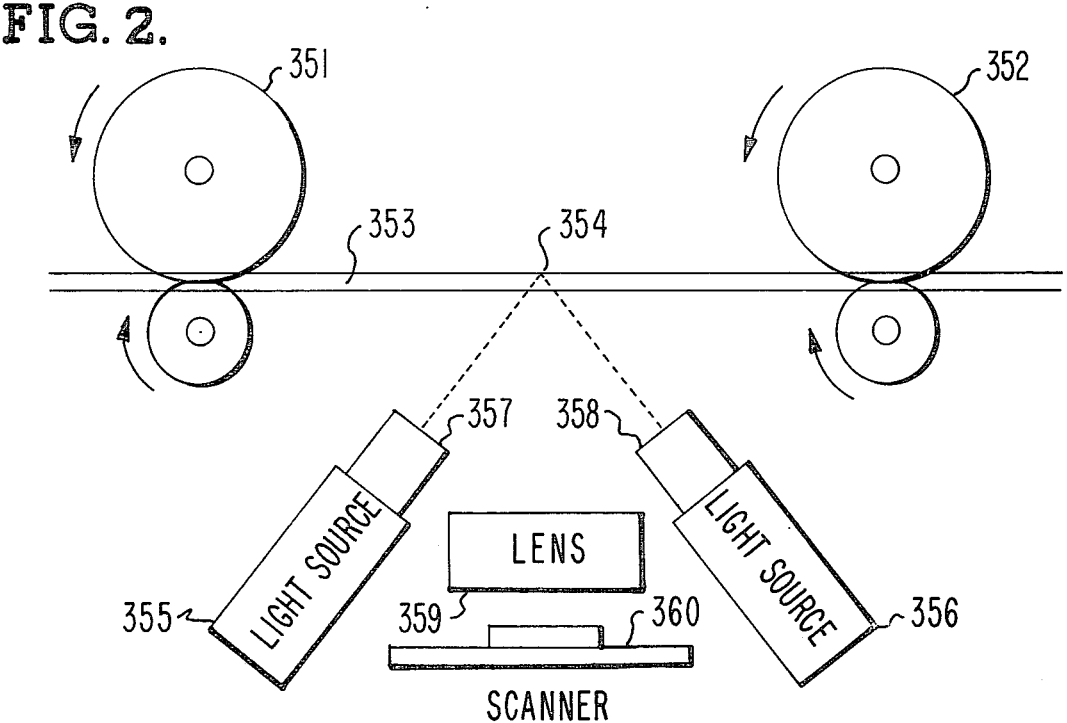
FIG. 2 is a schematic diagram illustrating how a document is moved, illuminated and the image on the document sensed.

Referring to FIG. 2 a driving means, including two pairs of complementary rollers at 351 and 352, moves or drives a document bearing the presented character from left to right at 75 inches per second. The rollers move the document along a track 353 into a scanning area 354.

A continuously operating illuminating means or pair of light sources 355 and 356 illuminate the document in the scanning or sensing area 354. The light sources may be Sylvania Corporation "—quartz, halogen" lamps with one inch helium filaments. The illuminating means further includes a pair of quartz blocks 357 and 358 which are optically polished and used as light guides to guide the light to the surface of the document in the sensing area 354.

Light reflected from a document travels through a lens 359 to a focusing means. The lens may be a Kowa lens having focal length of 20 millimeters, and F number of 2.8. A magnification of $\frac{1}{4}$ is obtained with suitable object and image distances. Thus, the $\frac{1}{2}$ inch scan band on the document translates into 0.125 inch at the sensor.

Figure 4:
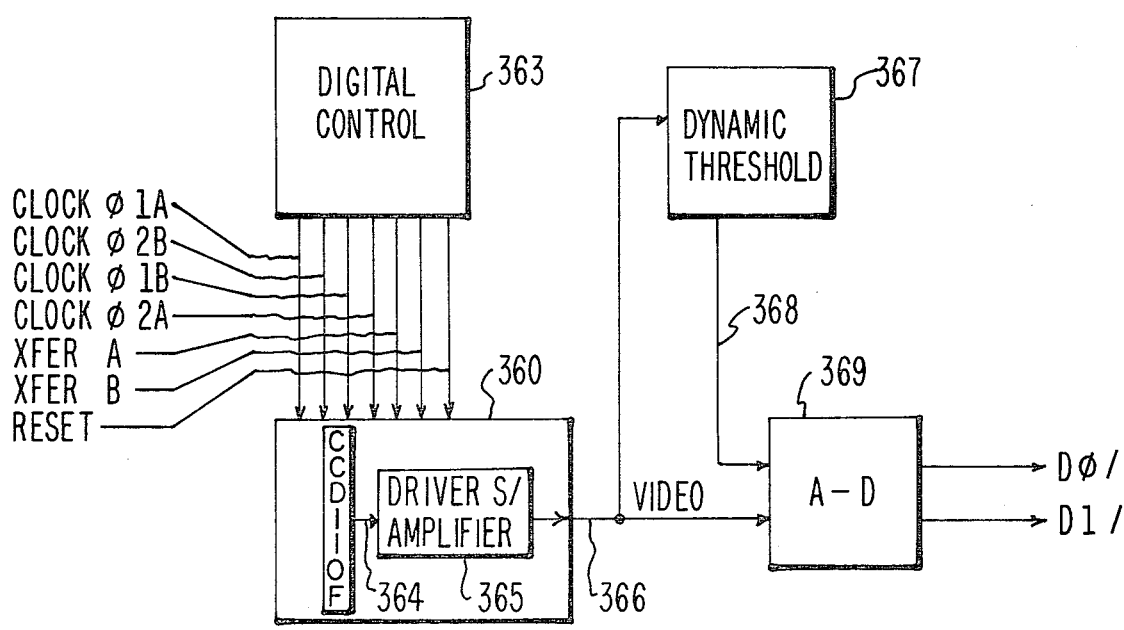
FIG. 4 is a block diagram showing how the analog signal developed by the particular scanner is conditioned and converted into a digital signal.
Figure 3:
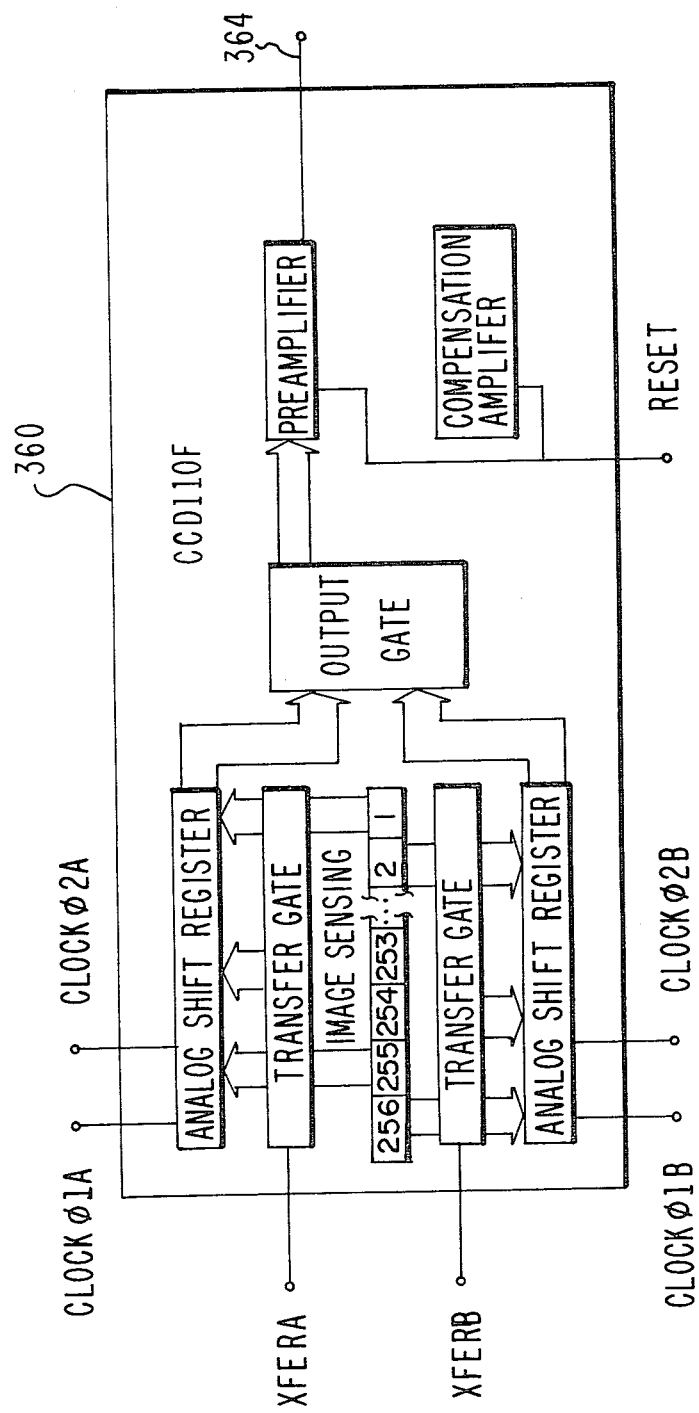
FIG. 3 is an enlarged schematic drawing showing the pin positions of the particular scanner used in the subject invention.

A scanner or scanning means, generally indicated at 360 in FIGS. 2, 3 and 4, optically scans the presented character by being responsive to the reflected light at sensing area as focused by the lens. The scanner may be a Fairchild, CCD110F, which is a charged coupled photosensitive device having 256 photosensitive elements, each 0.0005 inch square, in a row to provide an array 0.128 inch high.

Figure 5:
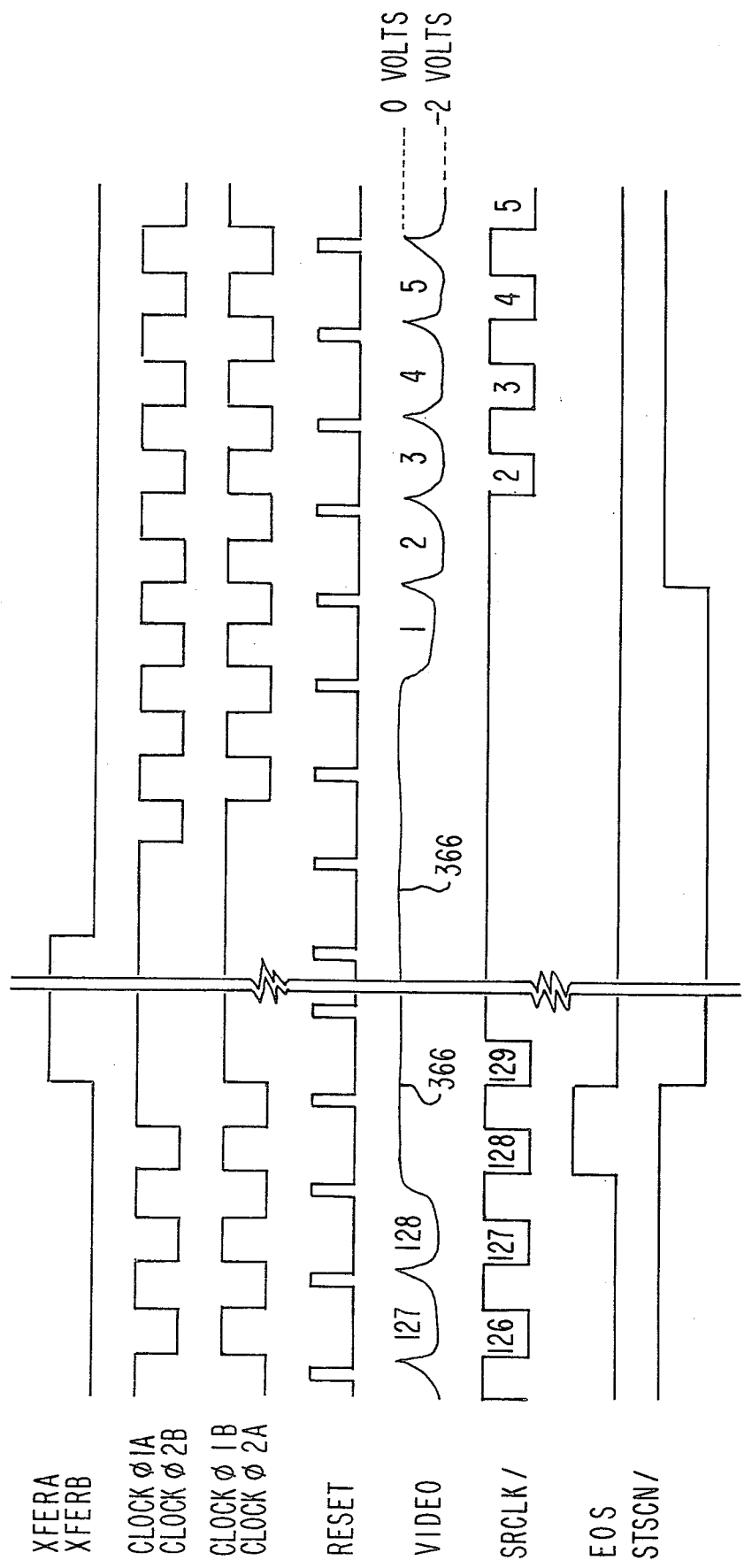
FIG. 5 is a timing diagram of the signals shown in FIG. 4.
Figure 6:
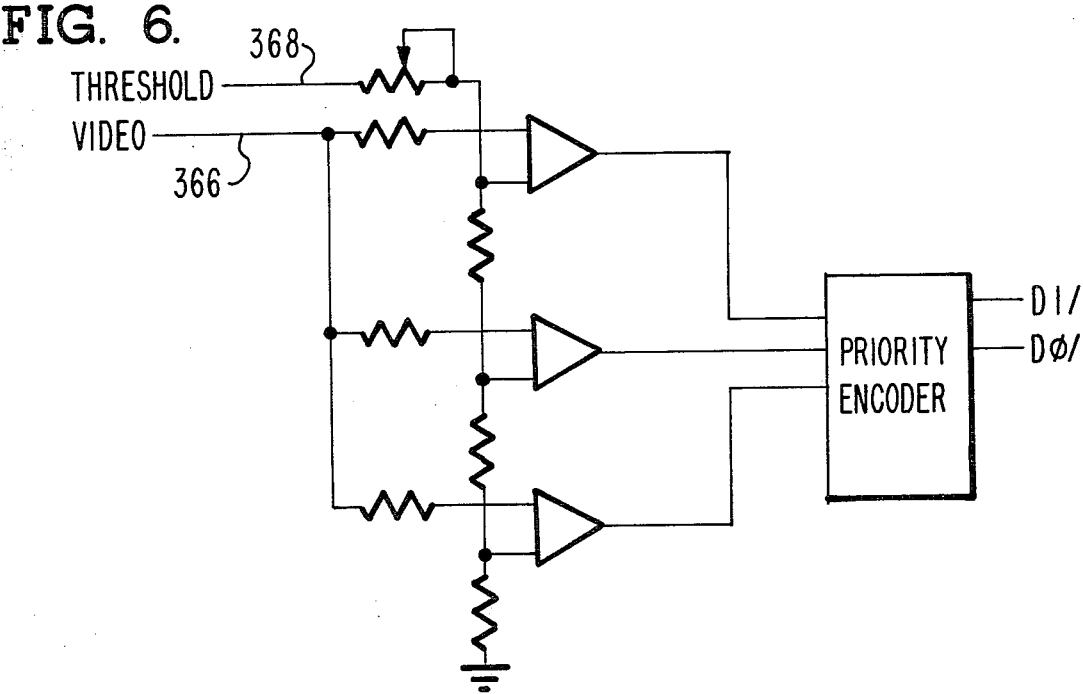
FIG. 6 is a diagram showing the analog-to-digital converter of FIG. 4.

Referring to FIGS. 2 through 6, a digital control 363 provides control signals to the scanner chip 360. The transfer "A"-XFERA and transfer "B"-XFERB signals transfer analog data from the sensor elements to the analog shift registers internal to the chip every 53 microseconds. Thereafter, the four clock pulses shown, which operate at 2.5 MHz, clock such data out of the chip's analog shift registers to the chip's output gate where signals from adjacent sensor elements (such as 1 and 2, or 3 and 4) are added together to provide 128 analog outputs at conductor 364. An amplifier 365 on the scanner board amplifies the video signal on conductor 364 to provide the analog video signal at conductor 366. Such analog video signal is zero volts for black on a document and minus 2 volts for white on a document and shown pictorially in FIG. 5. Also shown on FIG. 5 is the 2.5 MHz reset pulse to the scanner chip and the 2.5 MHz serial clock SRCLK/signal which is used to clock downstream shift register circuitry.

The analog video signal on conductor 366 (FIGS. 4 and 5) is input to dynamic threshold circuitry 367. The dynamic threshold circuitry is advantageous because the hardest characters to detect on a document are letters that have little contrast from the background level of the document due to poor printing of the characters thereon. For example, a white document media having a background level of −2.0 volts while a blue document media background level of −1.5 volts. Thus, a fixed threshold level of mixed light characters on the light document. Accordingly, dynamic threshold circuit 367 puts out an analog voltage on conductor 367 such that when the background level is −2.0 volts, then the threshold levels in A to D converter 369 are approximately −1.8, −1.6, and −1.4 volts; when the background level is −1.5 volts, then the threshold levels in A to D converter 369 are approximately −1.3, −1.15 and −1.0 volts. Such dynamic thresholds may be provided internal to block 367 using peak threshold circuitry that rapidly charges to the background level to more slowly discharge from the background level. The A to D converter block 369 of FIG. 4 may be provided by the circuitry of FIG. 6. Three LN311 voltage comparators compare the incoming video signal on conductor 364 to three dynamic voltage threshold levels as provided by resistive dividers from the voltage provided by conductor 368. The outputs of the LN311's are input to a priority encoder that puts out a two bit digital code representative of the video signal at 366. The block 369 provides A to D converter means.

Figure 9:
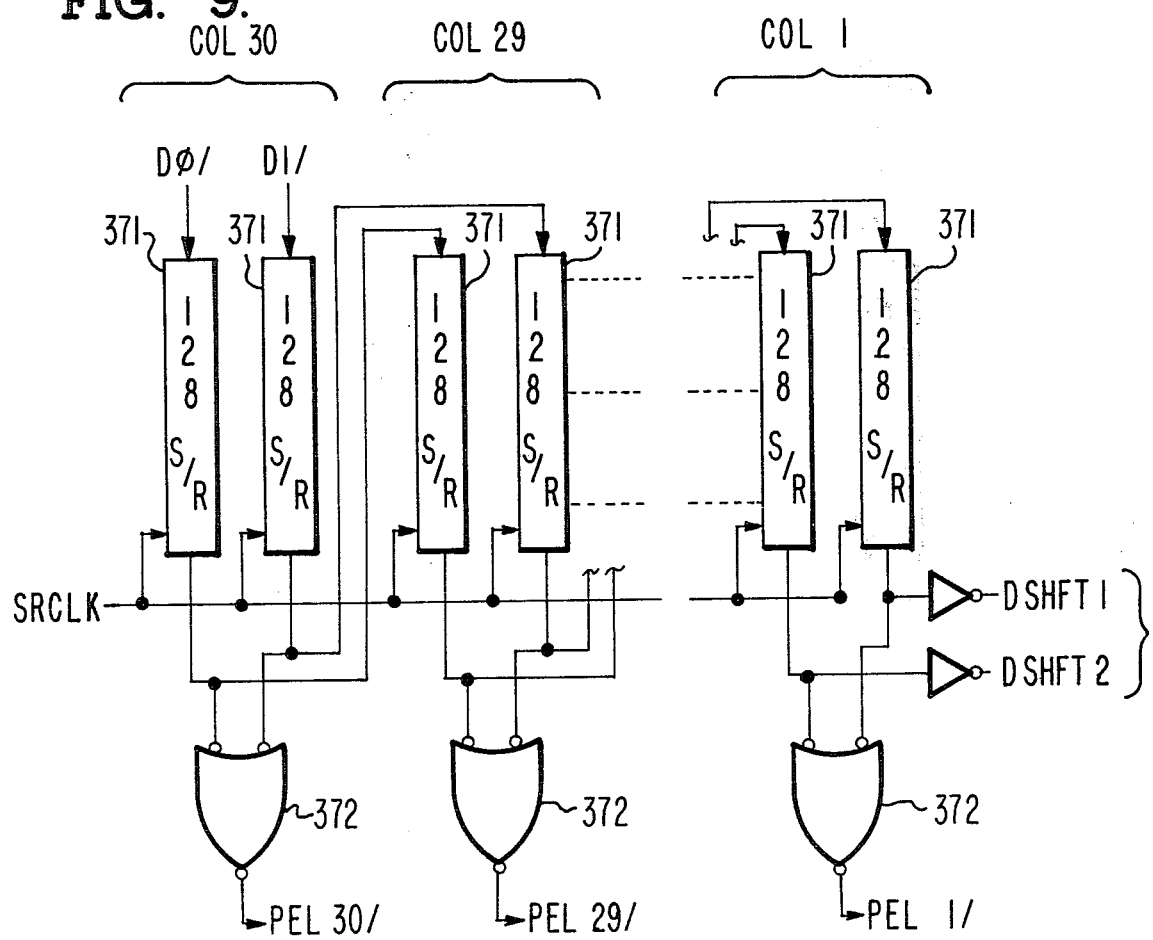
FIG. 9 shows a storage area for storing the digital image generated.

FIG. 9 shows circuitry that may be used to provide the digital image storage block 342 of FIG. 1. The function of block 342 is to store the digital image for an entire character at once so that the bottom, top, right and left edges of the character can be located. Once these are located, the heighth and width of the characters are known and the character's heighth and width can each be divided into five approximately equal parts such that the character can be divided into 25 approximately equal area subregions. FIG. 7 shows pictorially in stop action what typical characters might look like as they roll through a shift register circuitry of FIG. 9.

More particularly with respect to FIG. 9, the digital image storage is provided by 30 columns of shift register circuitry (such as provided by shift registers 371) with each column being two bits wide and 128 bits long. The data input comes from A to D converter block 369 and enters the top of the shift register column 30. The original data is clocked through the shift registers by serial clock not SRCLK/ which is a 2.5 MHz clock (the same frequency that transfers data out of the optical scanner 360 in real time). The data passes from the bottom shift register column 30 to top of shift register column 29 and so on until it comes out the bottom of shift register column 1 as indicated by D shift 1 DSHFT1 and D shift 2 DSHFT2 on FIG. 9. A plurality of gates (indicated as 372) connected to the bottom of the shift registers, indicate when the one bit is in the bottom of a given column of the storage area, and feed to edge detect and segmentation control 343. A typical OCRA character 0.080 inch wide and 0.120 inch high will provide data in 20 columns in width (out of 30 columns) and be approximately 30 bits high (out of 128 bits) as it rolls through the shift register circuitry. The shift register circuitry of FIG. 9 provides storage means for storing multi-bit codes in an array wherein a plurality of such codes defines the presented character and wherein the magnitude of the multi-bit code represents the brightness (darkness) of the corresponding portion of the presented character.

Figure 10:
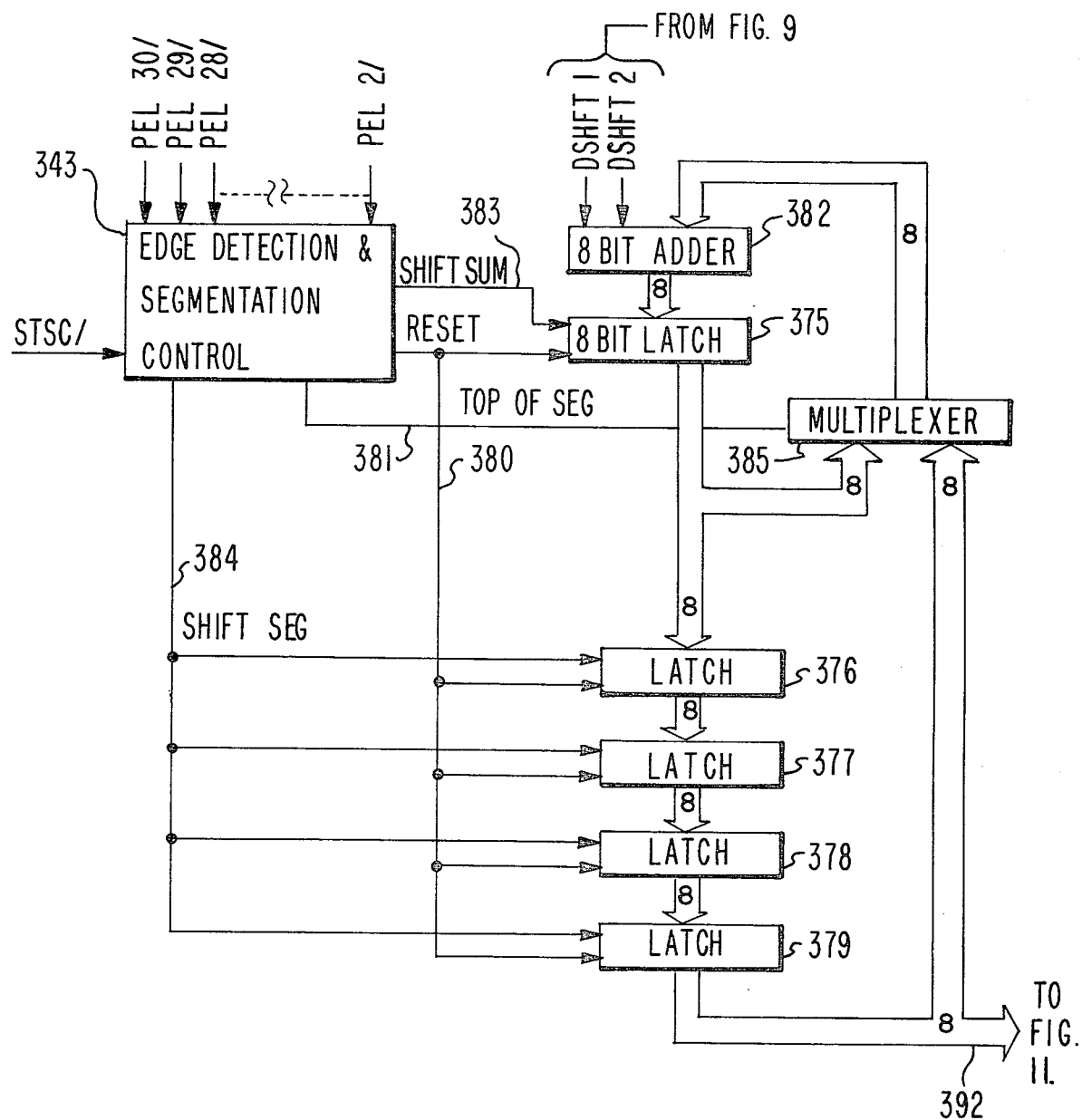
FIG. 10 shows in block diagram form how a numerical sum is obtained representing the reflectance of a particular character in its subregions.

FIG. 10 includes the edge detection and segmentation control block 343 of FIG. 1. The function of block 343 is to monitor the bottom of a shift register, via PEL2/- through PEL30/, as the character rolls through shift registers of FIG. 9 and determines the bottom edge, top edge, right edge and left edge of the character. Once these are known, block 343 provides the subheight and subwidth for each of the 25 subregions. FIG. 8 shows pictorially what a typical character might look like when divided into 25 subregions.

More particularly with respect to block 343, the start scan not STSC/ (start of scan signal) from FIG. 5 indicates the start of each video scan. Block 343 then starts looking for the bottom of the character, and temporarily identifies a bottom when three adjacent columns of one row have information in them and two adjacent columns of the row above that row have information in them. Block 343 temporarily identifies a top of character when it senses two adjacent rows which are essentially blank. Block 343 identifies the right edge when it detects three adjacent locations having information in one column and in the adjacent column to its left. Now, as the right edge passes through column 3, the left edge is determined by finding two adjacent columns that are essentially blank. As the right edge of the character passes through, then a final determination of the top and bottom of the character are made using the criteria previously discussed. As the right edge of the character passes through column 1, block 343 calculates (using PROMs) the subheighth and subwidth of each of the 25 subregions.

FIG. 10 also shows circuitry that may be used to provide the segment summation block 344 of FIG. 1. The function of block 344 is to find the sum within each of the segments viewed pictorially in FIG. 8 as the data rolls out of the shift register storage of FIG. 9. The circuitry first finds the total magnitude within subregions C1 through C5, and then it goes onto C6 through C10 and so on.

Now particularly with respect to FIG. 10, each of the latches 375 through 379 is first reset via conductor 380. Multiplexer control 381 selects the output of latch 375 to be fed around to adder 382. The shifts from (SHIFT SUM) clock 383 (2.5, MHz) stores the current sum out of adder 382 for the first column of data for subregion C1. At the top of region C1, TOP OF SEG on conductor 381 selects the output of latch 379 into adder 382, and then the contents of the latches are shifted down to one latch by SHIFT SEG on 384 and SHIFT SUM on 383. This procedure is repeated until the contents of the first column of each of C1 through C5 has been summed. Then the procedure is repeated for the remaining columns of C1 through C5 until the latches 379 through 375 respectively contain the total segment summation for C1 through C5. At this point the five segment sums are shifted out in sequence at a 2.5 MHz clock rate to area normalization, and the latches 375 through 379 are reset in preparation for the arrival from the shift register of data from subregions C6 through C10. Thus, the segment summation circuitry outputs for each character five bits of five numbers (each 8 bits wide) with such 25 numbers being a total value within each of the subregions C1 through C25.

Figure 11:
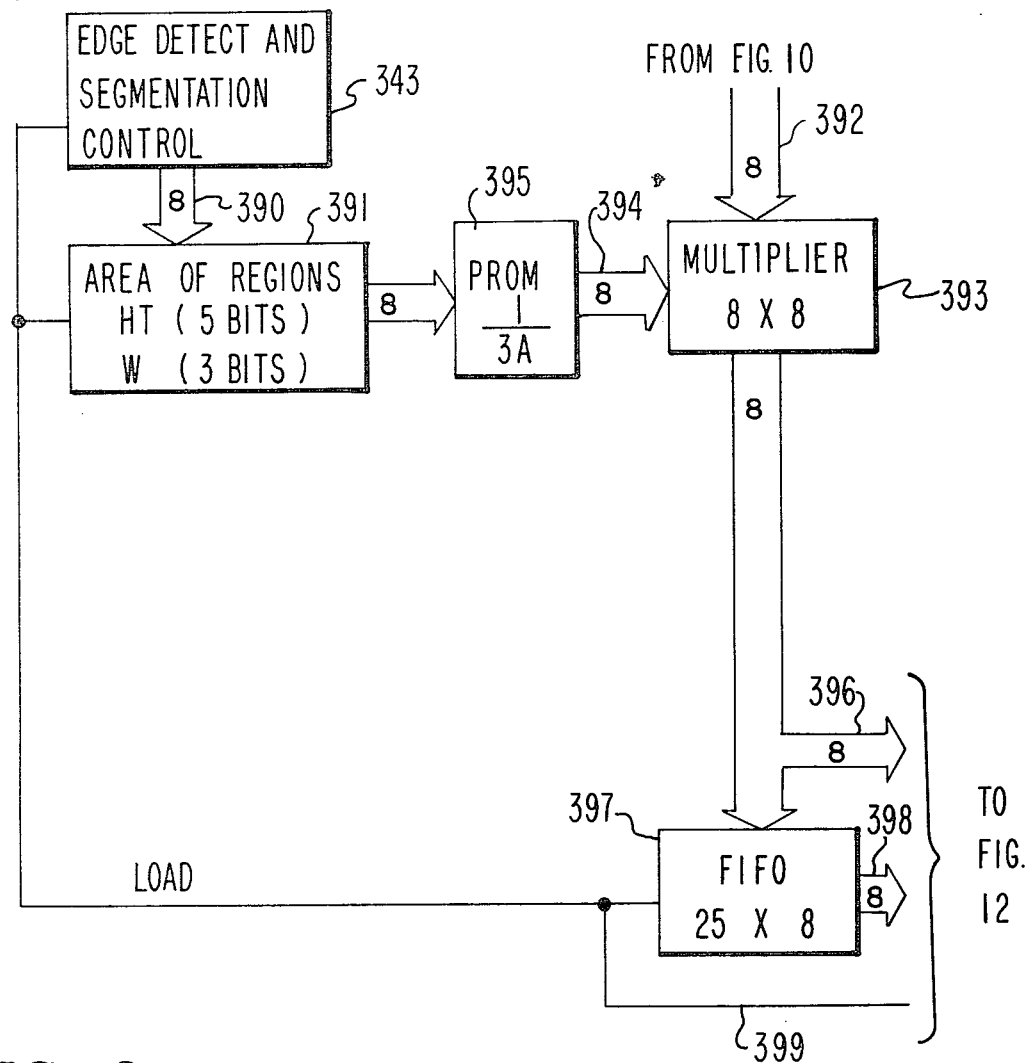
FIG. 11 shows in block diagram form how the sum from each segment is area normalized.

FIG. 11 shows circuitry that may be used to provide segment summation area normalization by 345 of FIG. 1. The function is to take each of the segments summation from FIG. 10 and divided each by its size of corresponding subregion area to provide the ink density in each of the 25 subregions. Actually, each segment summation is divided by three times its area such that the ink density for each region has a maximum value of one. The result is 25 numbers (each 8 bit) which represent the ink density in each of the 25 subregions.

More particularly with respect to FIG. 11, edge detect and segmentation 343 supplies, via path 390, 5 (8 bit) numbers at a time which are stored in area of region block 391. Five bits of each number represent the height of a subregion and three bits represent the width of a subregion. These numbers arrive and are stored prior to the arrival of a five segment summations at a 2.5 MHz, rate on path 392. The 8 bits of segments summations data arriving on path 392 are input to multiplier 393 as is an 8 bit number on path 394 which gives $\frac{1}{3}$A times the area of the subregion. PROM 395 provides the $\frac{1}{3}$(A) number when addressed by the appropriate 8 bit number prestored in block 391. Thus, as a burst of five segment summations appear on path 392, they are divided by three times the area of the appropriate subregion and provided in a burst of five area normalized segment summations on path 396. These five area normalized segment summations are also stored in FIFO 397. FIFO 397 can hold 25 words (each 8 bit) and after five burst of five words each, FIFO 397 holds 25 words which represent the area normalized component C1 through C25.

Figure 12:
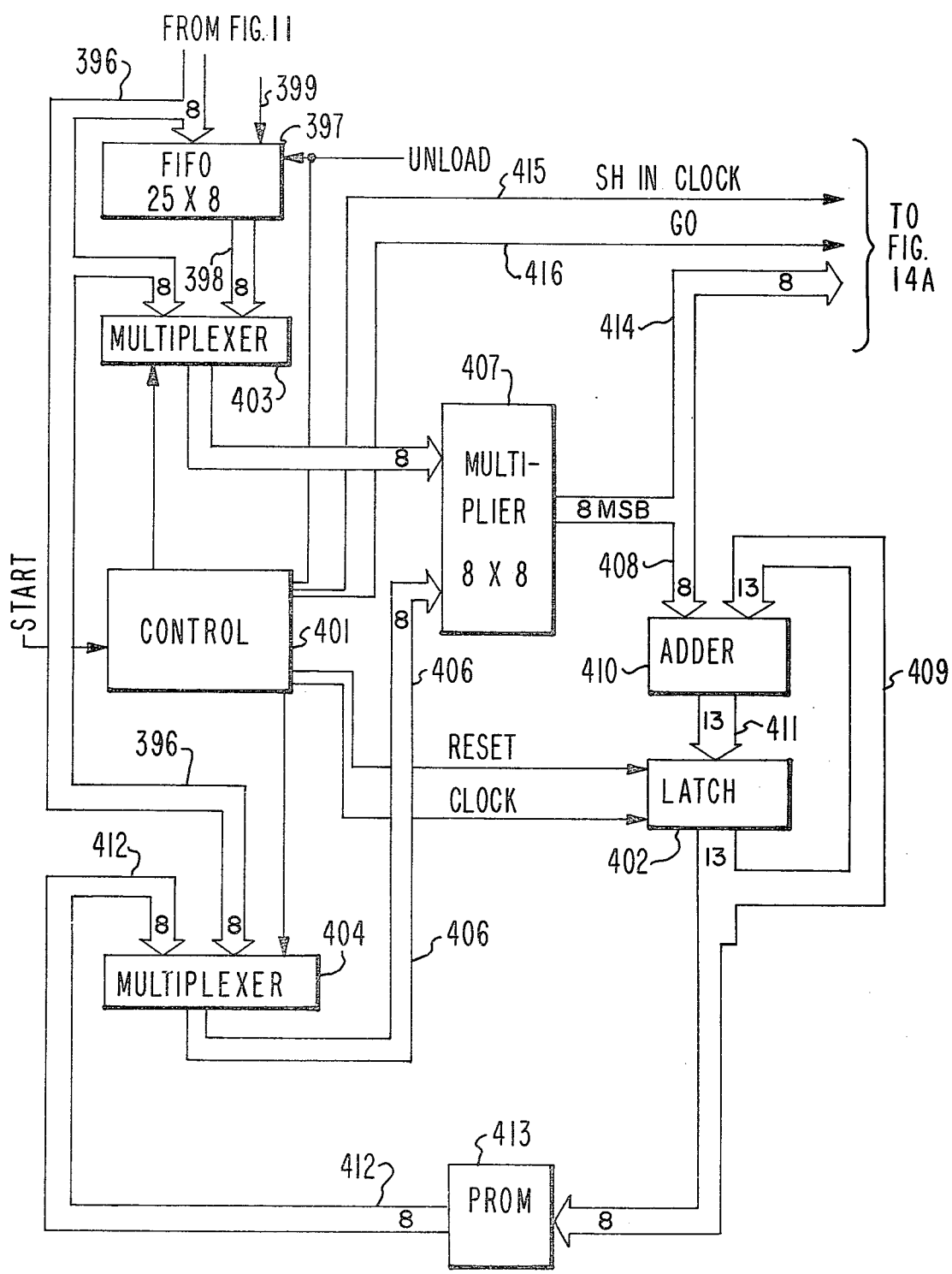
FIG. 12 shows in block diagram form a circuit for normalizing each feature vector to unit length.

FIG. 12 shows circuitry that may be used to provide feature vector normalization to unit length block 346 of FIG. 1. The function is to take the feature vector provided by the circuitry of FIG. 11 and normalize it to unit length. First, each component of the incoming feature vector is multiplied times itself and these squared components are added together to the length of the incoming feature vector squared. Second, one over the length of the incoming feature vector is determined by taking one over the area of the feature vector squared. Third, each original incoming component of a feature vector is multiplied by one over the length of the incoming feature vector to provide a feature vector having components normalized to unit length. (Any feature vector normalized to unit length when projected onto itself) each term being squared and the squared terms added (will yield a projection by one emission).

First, each component of the incoming feature vector is multiplied by itself and these squared components are added together. The latch 402 is first reset to zero. The incoming components arrive on path 396 as first supplied as previously described and are also stored in FIFO 397 as previously described. As the 8 bit components appear on path 396, they pass through multiplexers 403 and 404 and along path 405 and 406 to multiplier 407 where they are multiplied together. Then the product on path 408 is added by adder 410 to the contents of latch 402 as presented on path 409. Next the output of adder 410 on path 411 is latched into latch 402 which holds the partial sum. This procedure of multiplying the component by itself and adding the product to the contents of the latch 402 is repeated for the other 24 components such that the latch 402 then contains the length of the incoming feature vector squared.

Second, one over the length of feature vector is provided on path 412. The output of latch 402 is provided on path 409 and is 13 bits representing the length of the feature vector squared. The most significant 8 bits of path 409 are input to PROM 413 which has prestored data therein which when addressed by the value L squared on path 409 provides one over L on path 402.

Third, each original incoming component of the feature vector is multiplied by one over the length of the feature vector to provide a feature vector having components normalized to unit length. One over L on path 412 now passes through multiplexer 404 and into multiplier 407 via path 406. The 25 components of incoming feature vector are now unloaded in sequence from FIFO 397 and pass through multiplexer 403 to multiplier 407 via path 405. The result is that the 25 components normalized to unit length appear on path 414 and are passed onto storage in the projection circuitry along with a clock 415. And a GO signal appears on conductor 416 to start the projection process.

The feature vectors are normalized to unit length to simplify the hardware of the projection circuitry.

Figure 13:
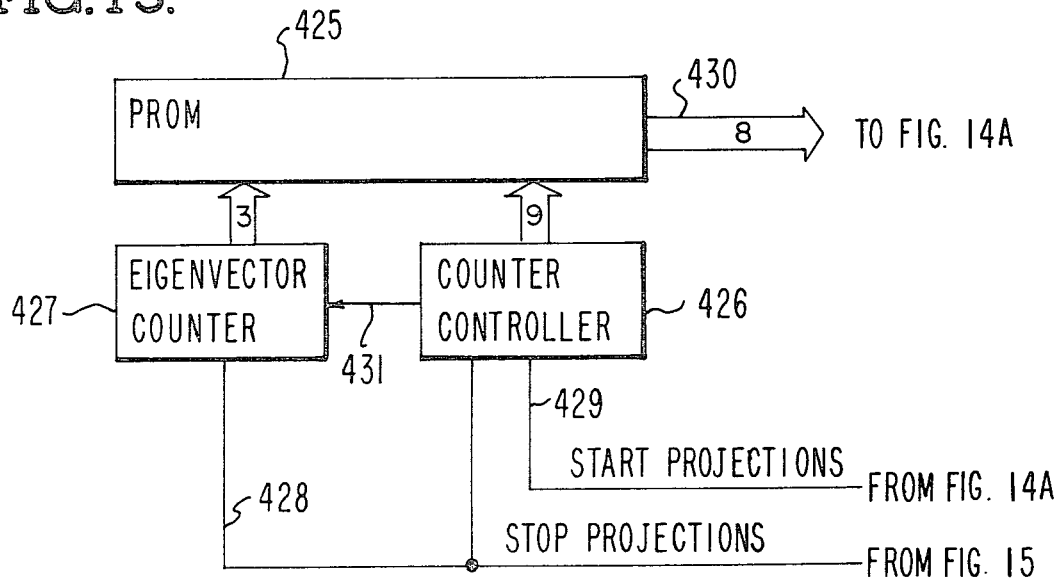
FIG. 13 shows in block diagram form circuitry for providing multi-dimensional classes of eigenvectors.

FIG. 13 shows circuitry that may be used to provide the multidimensional classes of stored eigenvectors per block 347 of FIG. 1. The eigenvectors are stored in the PROM 45. To review briefly, there are two zero classes of characters, each class has five eigenvectors stored in PROM 425 and each eigenvector is formed by 25 (8 bit) bytes. Thus, the PROM 425 contains 2500 bytes of data with each byte 8 bits wide. Internal to the PROM, the bytes are arranged in groups based on which subspace they belong to. Briefly, the most significant eigenvector of each class is stored together as a 500 byte group. In similar manner, the second through fifth eigenvectors of each class are each stored together as 500 byte groups. Nine bits from counter controller 426 select the appropriate byte and 3 bits from eigenvector counter 427 select the appropriate subspace (most significant eigenvector, second most significant eigenvector, third most significant eigenvector and so on).

The five most significant eigenvectors for each class (the class for example being zeros) are generated starting from samples of prototype characters of that class. For example, a 1,000 samples of class (such as zeros) might be used. These could include, for example, round zeros, square zeros, and zeros with white dots, light bottoms, light sides, or light corners. These samples are then fed through the scanning system depicted by the blocks 340 through 346 of FIG. 1. The results of the block 346 would be 1,000 prototype feature vector normalized to unit length.

These 1,000 prototype feature vectors are then used to provide a 25 by 25 autocorrelation matrix in the original 25 dimensional orthonormal coordinate system. The autocorrelation matrix is then diagonalized. Diagonalization involves rotating the 25 dimensional orthonormal coordinate system in space until all the off diagonal elements (off the upper left to the lower right diagonal) are zero (less than 10) in value. The 25 values then left along the diagonal of the autocorrelation matrix are referred to as the 25 eigenvalues, then each row of the autocorrelation matrix has 25 values, (24 of which are approximately zero) which 25 values from an eigenvector in the rotated coordinate system. The 25 eigenvalues along the diagonal are compared in magnitude; with the row of the autocorrelation matrix having the largest eigenvalue being defined as the most significant eigenvector; with the row of the autocorrelation matrix having the second largest eigenvalue being defined as the second most (significant) and eigenvector and this procedure is followed for a total of five eigenvectors (an arbitrarily chosen number).

These five eigenvectors (each of which in general have one non-zero turn) are, however, referenced to the rotated (25 dimensional orthonormal) coordinate system which is different from the original (25 dimensional orthonormal) coordinate system in which the feature vectors of the unknowns will appear. Thus, the five eigenvectors must be projected back into the original (25 dimensional orthonormal) coordinate system. This can be accomplished, however, because it is known how the coordinate system was previously located to diagonalize the autocorrelation matrix. The five eigenvectors (for the class zero) are thus projected from the rotated coordinate system back into the original coordinate system. In the original coordinate system, the five eigenvectors will each have 25 components (8 bit bytes) which in general will all be non-zeros. The most significant eigenvector, if its components are plotted out on paper on a 5 by 5 matrix will, in general, appear somewhere like an average zero because it points in the zero direction. The second through fifth most significant eigenvectors are each orthonormal to the first eigenvector and each other, and so in no way appear to resemble a number (a zero) at all. These five eigenvectors are then each normalized to unit length to simplify the projection process.

These five unit length eigenvectors referenced to the original coordinate system are stored in the PROM 425 along with the five most significant eigenvectors of the other 19 classes. Eigenvectors for each of the other 19 other prototype characters (classes) are generated using the same procedure as above described. As previously stated, the most significant eigenvector of each class are stored together as a group, then the second most significant are stored together as a group and so on.

Prior to the beginning of each projection process, a stop projection signal on 428 resets controller 426 and counter 429. The projection process is started by a start projection signal 429 received from the projection circuitry. In response to such start signals, controller 426 addresses PROM 425 25 times at a 4 MHz rate to provide in sequence the 25 components of the most significant eigenvector of one class and then it pauses for a couple of clock cycles; and then it addresses the PROM 425 in similar manner to produce the components of the other 19 most significant eigenvectors corresponding to the other 19 classes. When all the components of the most significant eigenvectors (one eigenvector for each of the two zero classes) have been transmitted via path 430, then controller 426 bumps up the eigenvector counter 427 by a count of one via conductor 431. Then the second most significant eigenvectors (500 bytes) are transmitted via path 430 and so forth until all five eigenvectors of each class have been transferred or until a stop projection signal is received on 428. Such stop projection signal is generated when the decision algorithm block recognizes a character, or when it cannot recognize a character after completion of the projection of the unknown feature vector onto all five eigenvectors of each class.

The PROM 425 stores the eigenvectors and as such provides a storage means for storing an array of signals formed from a plurality of prototype vectors representing each class of characters.

Figure 14B:
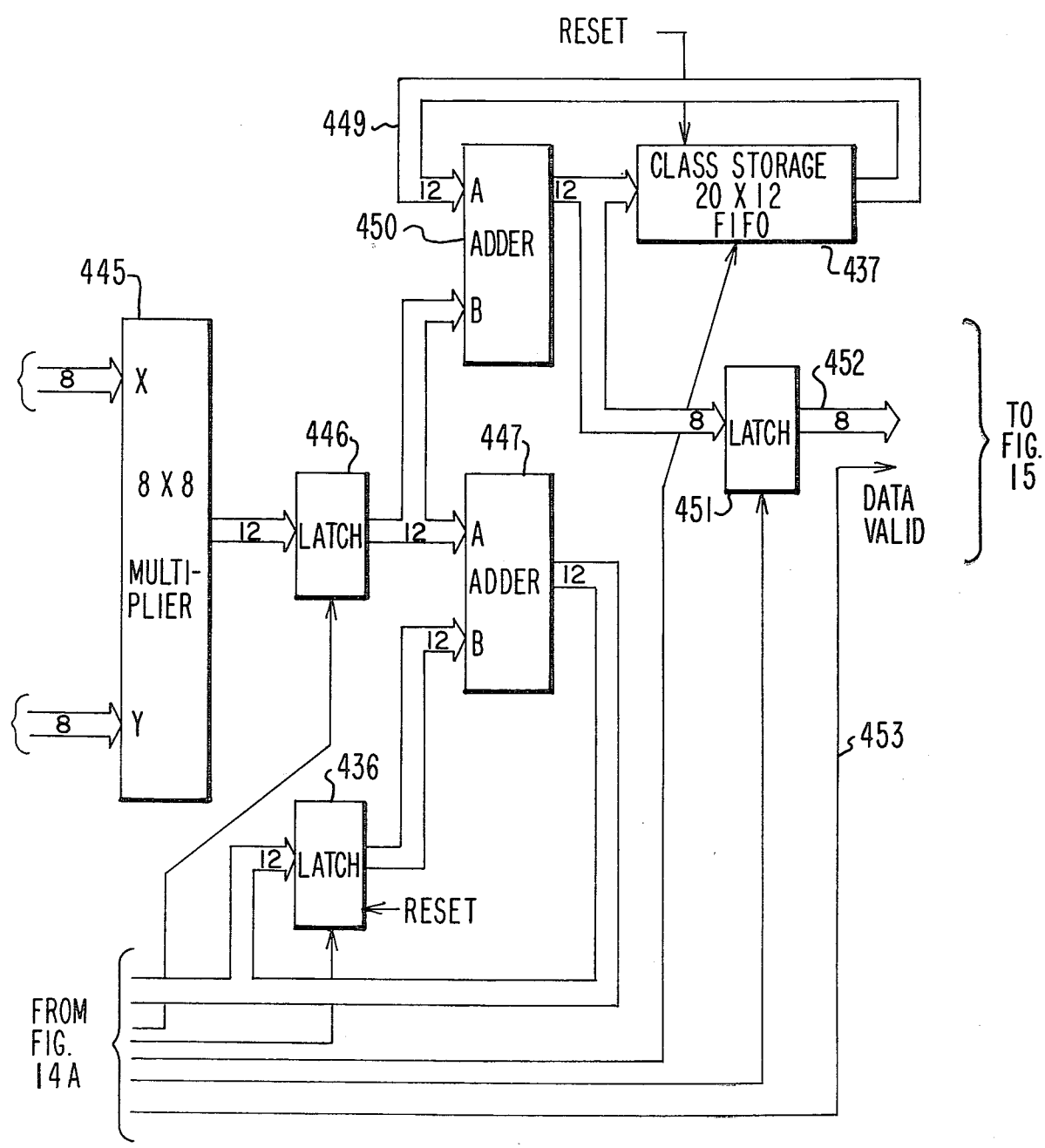

FIG. 14 shows circuitry that may be used to provide the projection of block 348 of FIG. 1. The function of FIG. 14 is to first project the feature vector to be recognized as the most significant eigenvector of each class. If a decision cannot be made after the first projection, then the feature vector to be recognized is projected onto the next most significant eigenvector of each class and a decision is attempted based on the net projection onto the first and second eigenvectors of each class. If a decision cannot be made after the second projection, then the feature vector to be recognized and projected onto the third most significant eigenvector of each class and a decision is attempted based on the net projection onto the first, second and third eigenvectors of each class. This procedure continues for the five sets of eigenvectors.

Briefly, the projection of the unknown feature vectors onto the eigenvectors involves the following:

(a) Multiplying corresponding to components of the feature vector and one eigenvector together and summing up these products to get the projection of the feature vector onto one eigenvector (called one dot product);

(b) Squaring the value of this projection;

(c) Adding the value of the squared projection (from b) to the sum of the square of all the projections for all previous eigenvectors for that class and this particular unknown feature vector to give the total projection squared. It is this total projection square that is used by the decision algorithm.

(d) Storing the sum of the squares of the projection for that class (from c) away for future usage.

(e) Resetting circuitry for the next class projection.

(f) Repeating (a) through (e) above for 19 other classes.

(g) Repeating (a) through (f) above for up to four more sets of eigenvectors if decision algorithm is not satisfied after each time step is completed.

Prior to beginning the projection process, control 435 resets (clears) latch 346 and resets (clears) FIFO class storage 437. Then, as the normalized unknown feature vector (25 components) appear on path 414 from FIG. 12 they pass through multiplexer 439 and are loaded into FIFO 438 by the clock 415 from FIG. 12. FIFO 438 holds 25 bytes (25 vector components) and each byte is 8 bits wide. Once the unknown feature vector is loaded into FIFO 438, a GO signal appears on 416 from FIG. 12 to start the projection process and a start signal appears on conductor 429. Thereafter steps (a) through (g) above are completed.

With respect to step (a) immediately above, the first component of the unknown feature vector is unloaded from FIFO 438 via path 440, passes through multiplexer 437 (back into FIFO 438) and also through multiplexer 441 into latch 442 at clock one time. The first component of one eigenvector is provided on path 430 (from FIG. 13) and passes through multiplexer 443 into latch 444 at clock one time. The outputs of latches 442 and 444 are input to multiplier 445 and the multiplication result is stored in latch 446 at clock two time, (the clock pulse appear at a 4 MHz frequency). (The second components of the unknown feature vector and the eigenvector are respectively stored in latches 442 and 444 at clock two time also.) Adder 447 adds the output of the latch 446 to the contents of latch 436 (initially cleared) and this partial sum is latched back into latch 436 at clock three time. This procedure of the contents of latches 442 and 444 being multiplied together with the resulting product being added by adder 447 to the contents of latch 436 is repeated for all 25 corresponding components of the feature vector and eigenvectors with the result that adder 447 outputs one number representing the dot product of the unknown feature vector and one eigenvector.

With respect to item (b) immediately above, this projection of the unknown feature vector onto one eigenvector is now squared. Adder 447 now contains a number representing this projection. The 8 most significant bits of the output of adder 447 are fed via path 448 to multiplexers 441 and 443 into latches 442 and 444. They are then multiplied together (squared) by multiplier 445 and stored in latch 446.

With respect to item (c) immediately above, the value of this squared projection from (b) above is added to the sum of the squares of all of the projections for all previous eigenvectors for that class and this particular unknown feature vector to give the total projections squared. That is, class storage 437 (a 20 byte FIFO 12 bits wide) contains the sum of the squares of all of the projections for all previous eigenvectors for that class and this particular unknown. (Class storage 437 is cleared at the beginning of each unknown feature vector.) Thus, the sum from 437 is fed via path 449 to adder 450 and the output of latch 446 is fed to adder 450. The output of adder 450 is thus the sum of the squares of the projections for all eigenvectors for this class onto which this unknown feature vector has thus far been projected.

With respect to item (d) immediately above, the output of adder 450 is reloaded into FIFO 437, and is also stored in latch 451 where it is available to the decision algorithm block 349 via path 452.

With respect to item (e) immediately above, a latch 436 is cleared to zero in preparation for projection of the unknown feature vector onto the next eigenvector.

With respect to item (f) immediately above, steps (a) through (e) are repeated for a 19 more eigenvectors (20 classes total) and then the decision algorithm block decides if it can recognize a character.

With respect to item (g) immediately above, steps (a) through (f) are repeated for up to the five most significant eigenvectors for each class if the decision algorithm cannot identify the character from the projections after each completion of item (f). If after all five sets of eigenvectors have been processed, the decision algorithm cannot recognize the character, the character is rejected.

To review briefly the output of FIG. 14 on path 452 of the unknown feature vector is projected onto each eigenvector, an 8 bit number representing the sum of the squares of all projections thus far made between that particular unknown feature vector and all eigenvectors of that particular class appears on path 452. In other words, this 8 bit number on path 452 is the length of the net projection (thus far made) squared. The decision algorithm adapted to work with squares of the net projections rather than the projections themselves. Thus after the unknown feature vector has been projected onto each of the 20 classes, 20 numbers have appeared on path 452 for analysis by the decision algorithm. The decision algorithm must have all 20 numbers (of the same eigenvector significance level) before it can make a decision; and these 20 numbers appear in sequence five times if all of the five most significant eigenvectors are being used before the decision algorithm is satisfied.

The circuitry of FIG. 14 provides the projecting means of the second embodiment. Multiplier 445 together with paths 430 and 454 of other components provide multiplier means for multiplying corresponding components of the feature vector and eigenvectors together to obtain a plurality of partial sums. Adder 447 and other components provide a first adding means for adding said plurality of partial sums together. Multiplier 445 together with path 448 and other components provides squaring means for squaring values. Adder 450 together with other components provide a second adding means for adding the value representing the squared length of the feature vector projected into the one dimensional subspace and the corresponding squared value generated from end further projections. These last four means are all part of the projecting means of the present embodiment.

Figure 15:
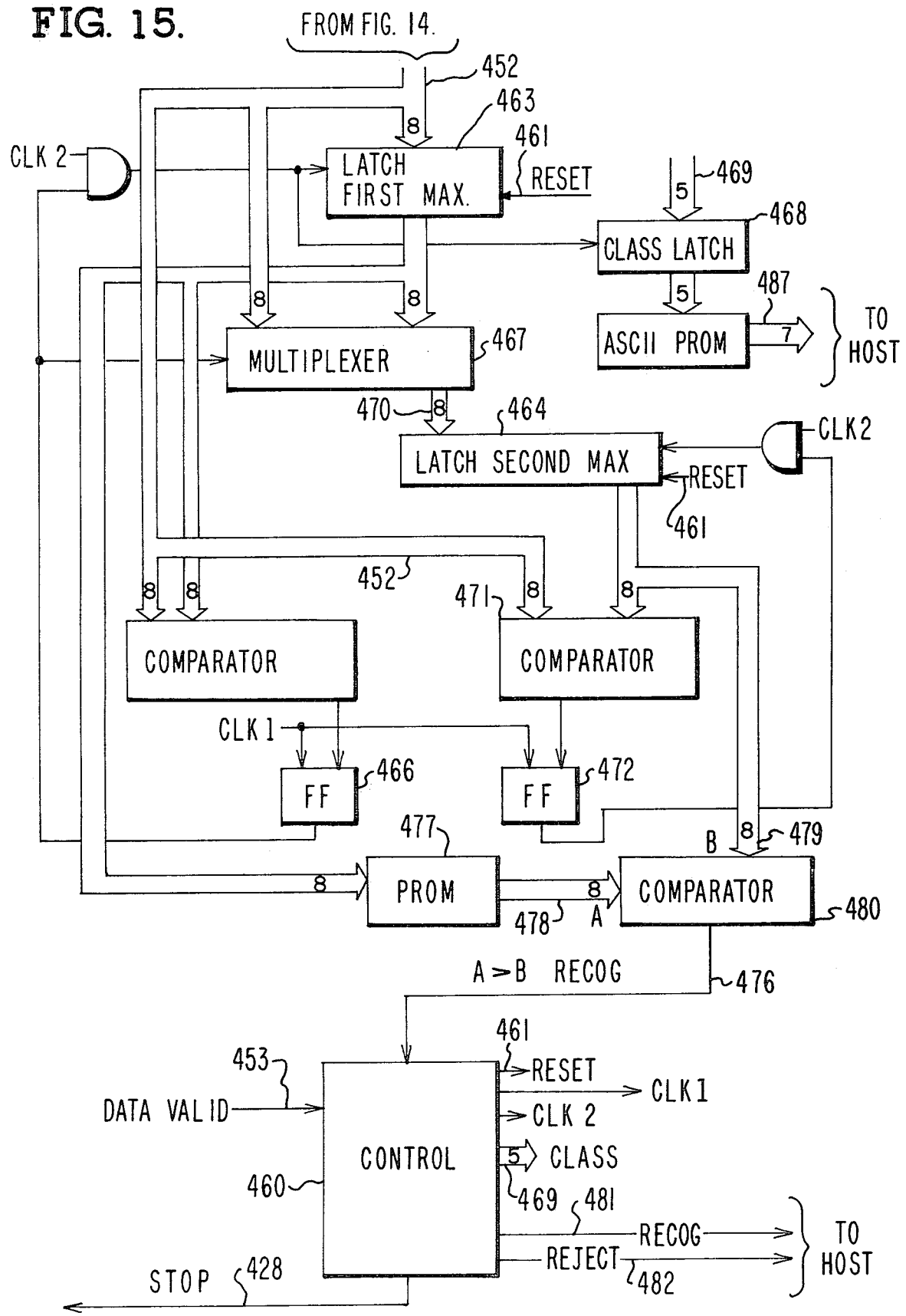
FIG. 15 shows in block diagram form the class selection circuitry for selecting which one of the 20 classes of characters the presented character represents.

FIG. 15 shows circuitry that may be used to provide the decision algorithm block 349 of FIG. 21. Prior to receiving data for a given significant level of eigenvectors, the circuitry is reset. The decision algorithm block then receives 20 bytes of data on path 452 corresponding to the net projections squared for 20 eigenvectors of the same significant level. The circuitry monitors these two zero inputs and selects the largest and the next largest value. After all 20 bytes of the same significant level have been received and processed, then the decision algorithm compares the largest and the next largest according to the straight line algorithm of FIG. 16. If a character can be recognized according to FIG. 16, then the projection process is stopped, otherwise the circuitry of FIG. 15 is reset and the process is repeated for up to five significant levels of eigenvectors.

More particularly with respect to FIG. 15, prior to receiving data for a given significant level of eigenvectors, control 60 generators a RESET pulse to reset first max. latch 460 and second max. latch 464.

Twenty bytes of data are then received on path 452 (corresponding to the net projection squared for eigenvectors of the same significant level) with a corresponding data value on conductor 453. In response to each data value signal, control 460 generates a Clock 1 CLK1 and then Clock 2 CLK2 signal. These two zero inputs on path 452 and stores the largest in latch 463 and the next largest in latch 464. There are three alternatives.

First, if the data on path 452 is greater than the current value in latch 463, the value on path 452 is placed in latch 463 and the contents of latch 463 is placed in latch 464. Briefly, comparator 465 will compare path 452 to the output of latch 463 (the current max.) will output a logical one which will be stored in flip flop 466 by Clock 1-CLK1. The output of flip flop 466 will feedback and at CLK2 time the data on path 452 will be latched into latch 460 to become the new max. period. Also at CLK2 the contents of latch 463 (which will pass through multiplexer 467) will be latched into latch 464 such that the old max. becomes the new second max. Also at clock two time, a five bit code from control 460 will be latched into latch 468 which codes indicates the class of the new max. number.

Second, if the data on path 452 is less than the current value in latch 463 and greater than the current value in latch 464, then the data on path 452 will be stored in the latch 464 (to become new second max) and latch 463

(first max) will remain unchanged. Briefly, comparator 465 will output a logical zero, which will pass through flip flop 466 such that the latch 463 will remain unchanged. Flip flop 466 also causes the data on path 452 to pass through multiplexer 467 onto path 470. Also, comparator 471 will compare the data on path 452 to the contents of latch 464 to determine whether the incoming data is greater than or less than the current second max. If the data on path 452 is greater than the latch 464, then a logical one is stored in flip flop 472 at clock one time and at a clock two time the new data on path 452 which has passed through the multiplexer 467 onto path 470 will be latched into latch 464 to become the new second max.

Third, if the data path 452 is less than the current value in both latch 463 and latch 464, comparators 465 and 471 will both put out a logical zero and the contents of latches 463 and 464 will not be changed.

Thus, after receipt of the 20 data values, the largest of the 20 will be stored in latch 463, the second largest will be stored in latch 464 and a number representing the class that the largest belongs to will be stored in latch 468. A PROM 475 is connected to latch 468 and provides an ASCII code on path 483 erepresenting the class the largest value belongs to.

Only after all 20 values have been received and processed, will the decision algorithm of FIG. 16 be applied to the contents of latches 463 and 464. Referring to FIG. 16, the value on the vertical axis is the largest value (stored in latch 463) and the value on the horizontal axis is the next largest value (stored in latch 464). If after plotting the intersection of these two values their intersection is above the straight line of FIG. 16, then the character is recognized and a logical one appears on conductor 476; if their intersection is below the straight lines of FIG. 16, then the character cannot be recognized and the projection process is continued for the next most significant eigenvector of each of the 20 classes. Referring back to FIG. 15, the max. value in latch 463 (a point on the vertical axis of FIG. 16) addresses a PROM 477 that provides on path 478 the corresponding value of the horizontal axis of FIG. 16 that represents a straight line algorithm shown in FIG. 16 thus, all that remains is to compare this value on path 478 with the value of the second largest (from latch 464 on path 479). Comparator 480 makes its comparison and if the value on path 478 is greater than the value on path 479, then the character is recognized and a logical one is provided on conductor 476.

If the character has been recognized, then control 460 outputs a recognized pulse on conductor 481 to the house together with ASCII data representing the character recognized on path 483. Also, a stop signal on conductor 428 stops the projection process.

If the character has not been recognized, then the searching of FIG. 15 is reset in preparation for receiving 20 values representing the total projection after the next most significant eigenvector of each class has been projected upon. If after completion of the projection of the unknown feature vector onto the five most significant eigenvectors of each class, and the character has not been identified, then control 460 generates a character reject signal on conductor 482 and stops the projection process via conductor 428 also.

The circuitry of FIG. 15 provides the selector means of the preferred embodiment.

The invention has been described in an illustrative manner and it is to be understood that the terminology which has been used is intended to be in the nature of words of description rather than of limitation.

Obviously many modifications and variations of the present invention are possible in light of the above teachings. It is, therefore, to be understood that within the scope of the appended claims, the invention may be practiced, otherwise than as specifically described.

The embodiments of the invention which an exclusive property or privilege is claimed are defined as follows:

What is claimed is:

1. An apparatus for recognizing a presented character as being in one of a plurality of predetermined classes of characters, said apparatus comprising:
generating means for generating a predetermined combination of signals representing the geometric configuration of the presented character, said predetermined combination of signals defining a normalized feature vector of the presented character;
first storage means for storing an array of signals formed from a plurality of prototype vectors representing each class of characters;
projecting means for projecting said feature vector onto a set of predetermined multidimensional subspaces characterizing the predetermined classes one dimension at a time, the subspaces being in the form of said stored array of signals wherein each of the subspaces approximates its corresponding prototype vectors in a least mean square error sense, said set of predetermined subspaces including sets of eigenvectors, each of said classes of characters being characterized by a set of eigenvectors and wherein said projecting means initially projects said feature vector on the most significant eigenvector of each of said sets of eigenvectors, said selector means selecting one of said characters if said algorithm is satisfied; and
selector means for selecting one of said characters as the presented character according to the pedetermined algorithm employing the results of said projections after each projection onto a dimension of the subspace, said selector means including logic means for allowing said projector means to project said feature vector on the next most significant eigenvector of each set and thereafter to the remaining eigenvectors in each set in the same fashion according to the significance of the eigenvectors in each set until said algorithm is satisfied.

2. The apparatus as defined in claim 1 wherein said set of predetermined subspaces comprises sets of eigenvectors and wherein said projecting means includes multiplier means for multiplying corresponding components of the feature vector and the eigenvectors together to obtain a plurality of partial sums for each projection of a paticular eigenvector with the feature vector, said projecting means including a first adding means for adding said plurality of partial sums together from each projection to obtain a value representing the length of the feature vector projected onto the one-dimensional subspace defined by the most significant eigenvector in each class of characters.

3. The apparatus as defined in claim 2 wherein said projecting means includes squaring means for squaring said value, said selector means selecting one of said characters by employing the results of said squared values.

4. The apparatus as defined in claim 3 wherein said projecting means includes a second adding means for adding the value representing the squared length of the feature vector projected onto the one-dimensional subspace and the corresponding squared values generated from N further projections of eigenvectors in a set until said algorithm is satisfied, to obtain a value representing the squared length of the feature vector projected onto the (N+1) dimensional subspaces defined by the most significant (N+1) eigenvectors in each class of characters.

5. The apparatus as defined in claim 4 wherein said selector means includes detector means for detecting the two largest values of each of said squared values.

6. The apparatus as defined in claim 5 wherein said algorithm comprises a straight line decision algorithm utilizing said two largest values of each of said squared values.

7. The apparatus as defined in claim 6 wherein said generating means includes driving means for moving a medium bearing the presented character into a sensing area.

8. The apparatus as defined in claim 7 wherein said generating means includes sensing means for sensing said presented character in said sensing area.

9. The apparatus as defined in claim 8 wherein said sensing means includes illuminating means for illuminating the medium in said sensing area.

10. The apparatus as defined in claim 9 wherein said sensing means includes scanning means for optically scanning the presented character and storing a video signal representing the presented character in an array, said scanning means being responsive to the brightness of the light reflected from the illuminated character over a given time period.

11. The apparatus as defined in claim 10 wherein said sensing means includes focusing means for focusing said reflected light, said scanning means being responsive to said focused light.

12. The apparatus as defined in claim 11 wherein said array comprises a photosensitive array.

13. The apparatus as defined in claim 11 wherein said generating means includes signal processing means for converting said stored video signal into a digital representation of said signal.

14. The apparatus as defined in claim 13 wherein said signal processing means includes sample and hold circuit means for measuring said video signal, said video signal being analog in nature.

15. The apparatus as defined in claim 13 wherein said signal processing means includes an analog-to-digital converter means for converting said analog video signal into a digital signal.

16. The apparatus as defined in claim 15 wherein said analog-to-digital converter means includes an encoder means for generating a multi-bit digital code for each digital signal.

17. The apparatus as defined in claim 15 wherein said generating means includes second storage means for storing said multi-bit code in an array wherein a plurality of said stored codes define the presented character and wherein the magnitude of said multi-bit code represents the brightness of the corresponding portion of said presented character.

18. The apparatus as defined in claim 17 wherein said generating means includes detecting means for detecting the edges of the presented character as defined by said stored codes.

19. The apparatus as defined in claim 18 wherein said generating means includes control means responsive to said detecting means for defining the location of said presented character in said second storage means.

20. The apparatus as defined in claim 19 wherein said generating means includes segmentation means responsive to said control means for dividing said presented character into a plurality of subregions.

21. The apparatus as defined in claim 20 wherein said generating means includes summation means for adding the multi-bit codes in each subregion together to obtain a corresponding summation for each subregion.

22. The apparatus as defined in claim 21 wherein said generating means includes area normalization means responsive to said control means for normalizing each of said subregions with the corresponding maximum summation possible in each of said subregions to form corresponding subregion densities, said corresponding densities defining components of the feature vector.

23. The apparatus as defined in claim 22 wherein said presented character is divided into 25 subregions and wherein said feature vector comprises a 25 dimensional vector formed from a 25 dimesnsional orthogonal coordinate system.

24. The apparatus as defined in claim 22 wherein said generating means includes vector normalizing means for normalizing the length of said feature vector to one unit wherein said normalized feature vector is projected onto said eigenvectors.

25. The apparatus as defined in claim 1 wherein said projecting means projects said feature vector onto at least the most significant three eigenvectors of each set prior to said algorithm being satisfied.

26. The apparatus as defined in claim 1 wherein said projecting means projects said feature vector onto at least the most significant four eigenvectors of each set prior to said algorithm being satisfied.

27. The apparatus as defined in claim 1 wherein said selector means includes signal means for emitting a reject signal in the event that said entire projection process is completed without said algorithm being satisfied.

* * * * *